United States Patent
Enomoto et al.

(10) Patent No.: US 7,369,257 B2
(45) Date of Patent: May 6, 2008

(54) SYSTEM INCLUDING PROXY SERVER FOR PROCESSING DATA IN PLACE OF CLIENT TERMINAL

(75) Inventors: Katsunori Enomoto, Toyokawa (JP); Yoshiyuki Kondo, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 636 days.

(21) Appl. No.: 10/386,457

(22) Filed: Mar. 13, 2003

(65) Prior Publication Data

US 2003/0187965 A1 Oct. 2, 2003

(30) Foreign Application Priority Data

Mar. 28, 2002 (JP) .............. 2002-091330

(51) Int. Cl.
  G06K 1/00 (2006.01)
  H04N 1/04 (2006.01)
  H04N 1/00 (2006.01)
(52) U.S. Cl. .............. 358/1.15; 358/474; 358/438; 709/201
(58) Field of Classification Search ........ 709/217–219, 709/201–203; 358/1.15, 474, 201, 202, 203, 358/217, 438, 439
  See application file for complete search history.

(56) References Cited

U.S. PATENT DOCUMENTS 5,754,711 A 5/1998 Shimizu et al.
5,757,958 A 5/1998 Shimizu et al.
6,169,789 B1 * 1/2001 Rao et al. .............. 379/110.01
6,385,586 B1 * 5/2002 Dietz .......................... 704/277
6,693,635 B1 * 2/2004 Yokomizo ................... 345/428
2001/0017708 A1 * 8/2001 Kobayashi et al. ........ 358/1.13

FOREIGN PATENT DOCUMENTS

| JP | A-05-189336 | 7/1993 |
| JP | A-07-222248 | 8/1995 |
| JP | A-07-319857 | 12/1995 |
| JP | A-2000-284930 | 10/2000 |
| JP | A 2001-101106 | 4/2001 |

OTHER PUBLICATIONS

FreeTranslation.com Main Page, printed from the Jul. 11, 2001 web archive of <http://www.freetranslation.com/>.*
FreeTranslation.com Help Page, printed from the Aug. 6, 2001 web archive of <http://www.freetranslation.com/default.htm?tab=help>.*

* cited by examiner

Primary Examiner—Houshang Safaipour
(74) Attorney, Agent, or Firm—Oliff & Berridge, PLC

(57) ABSTRACT

A client terminal scans original images from an original document and transmits a request data and the scanned data to a server via the WWW. The request data requesting the server to perform a 2-in-1 copy operation. The server processes the received scanned data so as to combining two-page-worth of scanned data into one-page-worth of process data, and transmits the process data back to the client terminal. The client terminal prints process data on a recording sheet.

22 Claims, 21 Drawing Sheets

FIG.5(a)
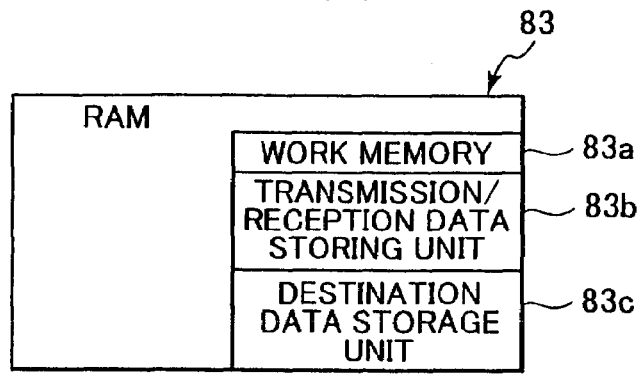
FIG.5(b)
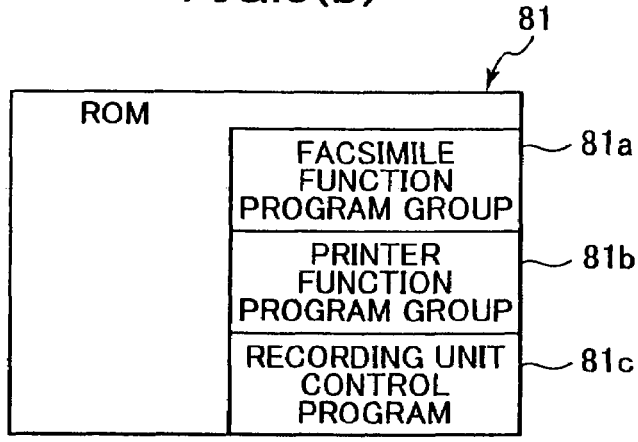
FIG.5(c)
(DESTINATION DATA STORAGE UNIT 83c)
| DESTINATION 1 | 03-**-** |
| --- | --- |
| | aaa@***.co.jp |
| DESTINATION 2 | 06-**-** |
| | bbb@***.co.jp |
| DESTINATION 3 | 052-*-** |
| | ccc@***.co.jp |
| ⋮ | ⋮ |
| DESTINATION n | TELEPHONE NUMBER |
| | E-MAIL ADDRESS |

FIG.6(a)
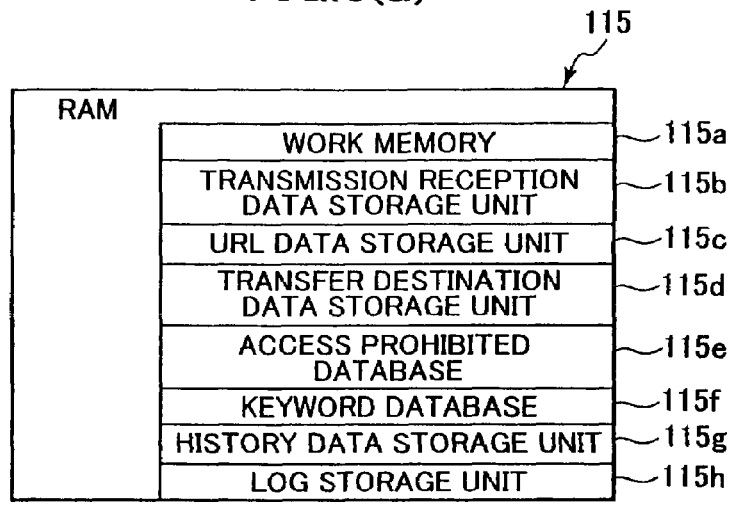
FIG.6(b)
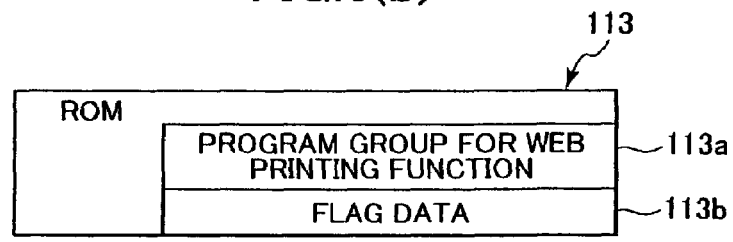
FIG.6(c)
(URL DATA STORAGE UNIT 115c)
| URL | MEMO | MONTHLY (DATE) | WEEKLY (DAY) | DAILY (TIME) |
|---|---|---|---|---|
| http://www.**.co.jp/ | XX COMPANY | 15 | – | – |
| http://www.**.co.jp/subdir/ | XX SHOP | – | THURS. | – |
| http://www.**.ne.jp/abc.htm | XX NEWSPAPER | – | – | 10:00 |
| http://www.**.go.jp/ | XX OFFICE | – | – | – |
| http://www.**.com/top.html | ***** | | | |
SCHEDULER SETTING DATA

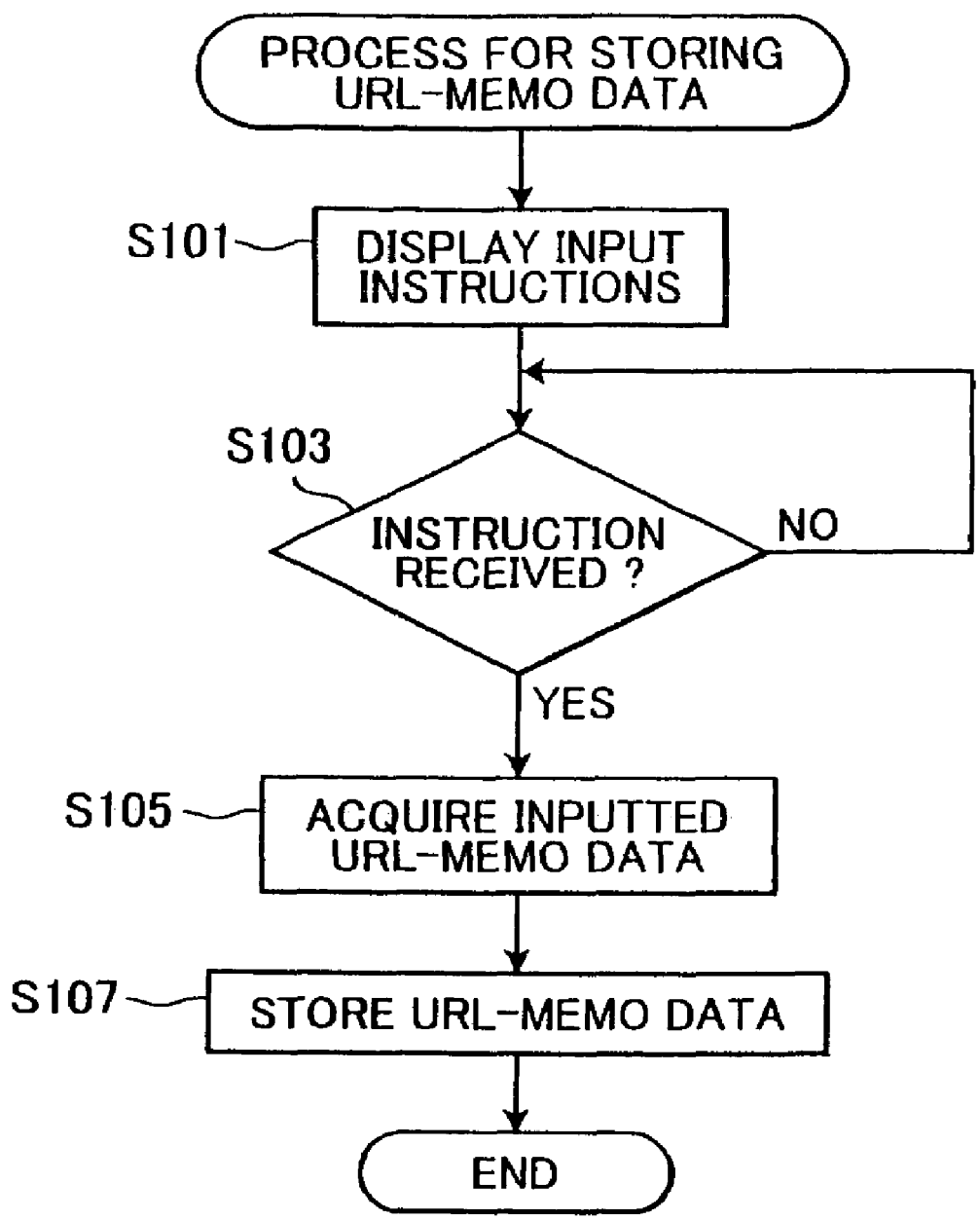

FIG.8

(FLAG DATA 113b)

| FUNCTION / OPERATING MODE | PRINT | SAVE | PRINTER TRANSFER | PC TRANSFER | MONOCHROME PRINT | QUIET PRINT | LOG SAVE | ERROR DISPLAY |
|---|---|---|---|---|---|---|---|---|
| NORMAL | 1 | 0 | 0 | 0 | 0 | 0 | 1 | 0 |
| URL ACCESS NOT AUTHORIZED | 0 | 0 | 0 | 0 | 0 | * | 1 | * |
| CANCEL PRINT | 0 | 1 | 0 | 0 | 0 | * | 1 | * |
| PASSWORD ERROR | 0 | 0 | 0 | 0 | 0 | * | 1 | * |
| KEYWORD ERROR | 0 | 0 | 0 | 1 | 0 | * | 1 | * |
| SAME CONTENT DETECTED | 0 | 0 | 0 | 1 | 0 | * | 1 | * |
| NIGHTTIME PRINT | * | * | * | 0 | * | 1 | * | * |
| ANSWERING MACHINE | 0 | * | 1 | 1 | * | 0 | * | * |
| LARGE VOLUME MONOCHROME PRINTING | 0 | 0 | * | * | 0 | 0 | 1 | 0 |
| OUT-OF-PAPER ERROR | 0 | * | * | * | * | * | 1 | 1 |
| OUT-OF-TONER ERROR | 0 | * | * | * | * | * | 1 | 2 |

(1 OR GREATER: ON, 0: OFF)
(MONOCHROME PRINT - 1: BLACK, 2: CYAN, 4: MAGENTA)

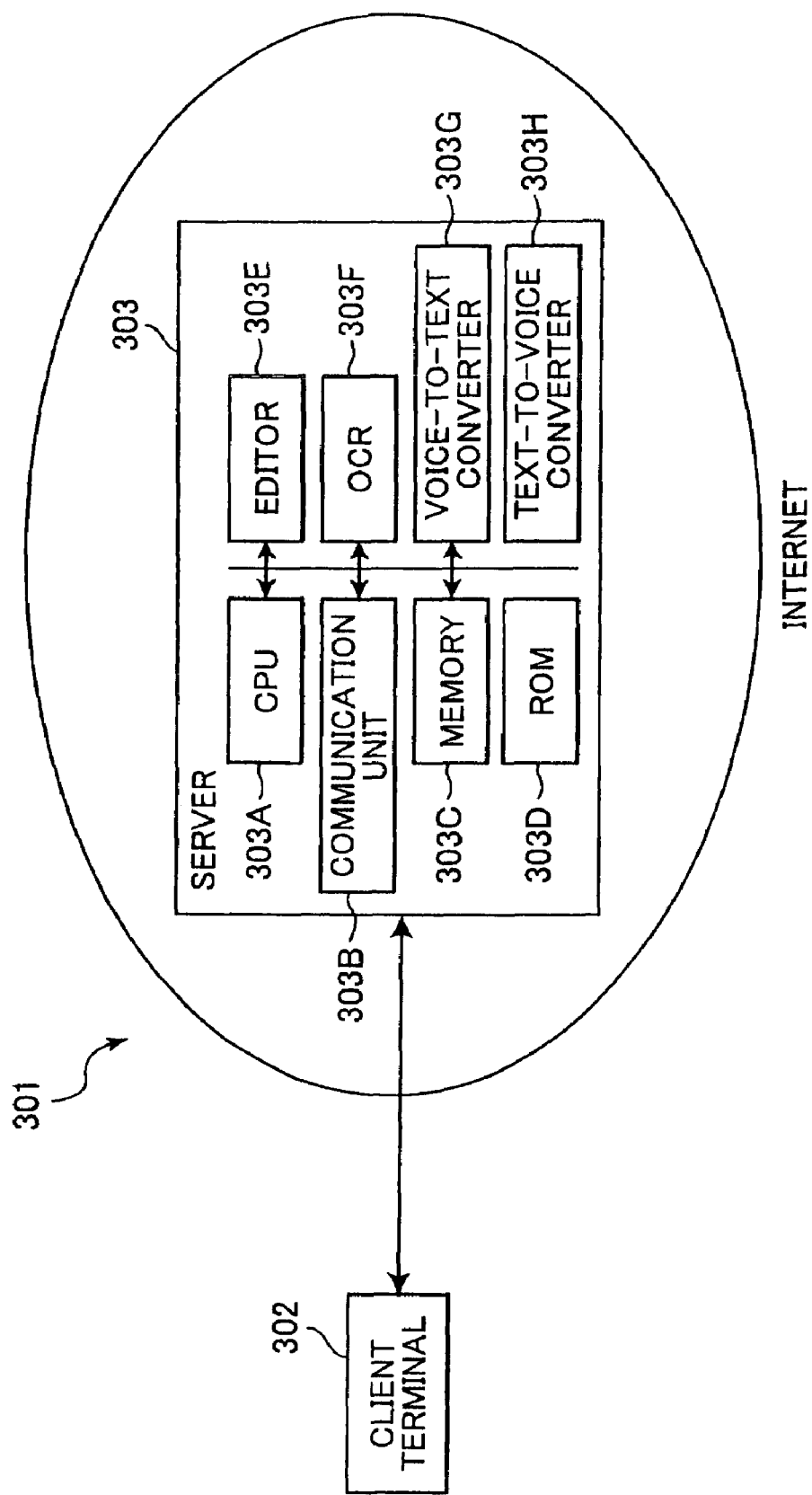

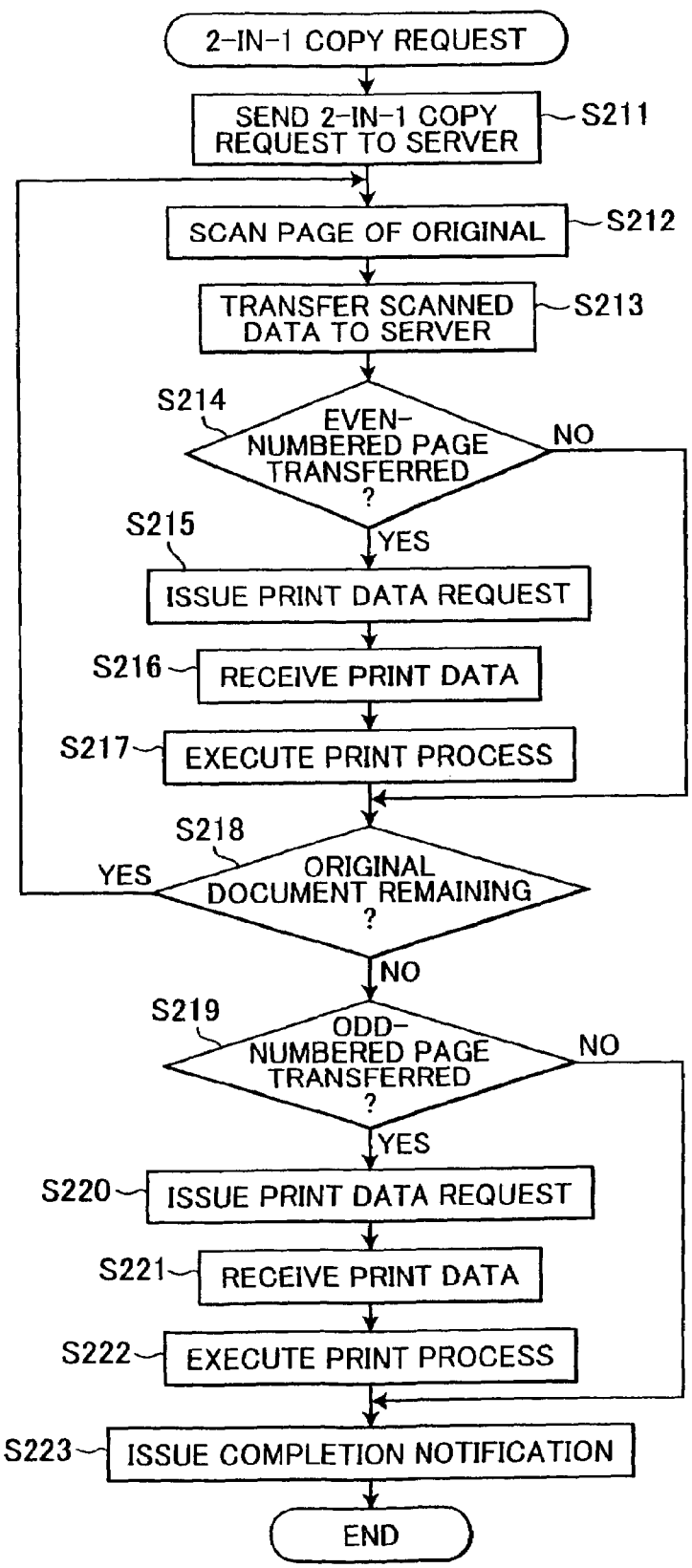

<CLIENT TERMINAL>

<SERVER>

SYSTEM INCLUDING PROXY SERVER FOR PROCESSING DATA IN PLACE OF CLIENT TERMINAL

BACKGROUND OF THE INVENTION

1. Field of the Invention

The present invention relates to a system including a client and a proxy server that processes data in place of the client.

2. Description of the Related Art

Japanese unexamined patent application publication No. 2001-101106 discloses an example of a conventional control technology for transmitting data from a file server connected to a network to a multifunction device. This technology enables a user to use desired applications and data on the multifunction device by downloading only the desired applications and data from the file server, thereby reducing the memory capacity required by the multifunction device.

However, in order to keep costs down, these multifunction devices invariably lack enough power for today's high-speed networks. In light of this, some models cannot even allocate sufficient storage area for downloading applications. Further, models provided with few resources in order to reduce costs cannot execute functions requiring large resources, such as compact copying functions ("2-in-1", "4-in-1", or the like), that require an extravagant memory capacity.

SUMMARY OF THE INVENTION

In view of the foregoing, it is an object of the present invention to provide a system that can eliminate adverse affects resulting from a client device having insufficient resources by directly a proxy server to perform specific functions requiring large resources for the client device.

In order to overcome the above and other objects, according to the present invention, there is provided a system including a client device and a server that communicates with the client terminal. The client device includes a data input unit that inputs an object data, a first transmission unit that transmits a request data and the object data to the server, a first receiving unit that receives a process data, and an output unit that outputs the process data. The server includes a second receiving unit that receives the request data and the object data from the client device, a data processing unit that processes the object data into a process data in accordance with the request data, and a second transmission unit that transmits the process data to the client device.

There is also provided an electronic device connected to a server including a receiving unit that receives a request data and an object data from a remote device, a data processing unit that processes the object data into a process data in accordance with the request data, and a transmission unit that transmits the process data to the remote device. The electronic device includes an input unit that inputs an object data, a transmitting unit that transmits a request data and the object data to a server via a network, a receiving unit that receives a process data into which the server has processed the object data in accordance with the request data, and an output unit that outputs the process data.

There is also provided a control method of controlling a network system. The control method includes the steps of a) inputting an object data to a client device, b) transmitting a request data and an object data from the client device to a server through a network, c) processing the object data into a process data in accordance with the request data at the server, d) transmitting the process data from the server to the client device, and e) outputting the process data at the client device.

There is also provided a control program of controlling an electronic device connected to a server including a receiving unit that receives a request data and an object data from the electronic device, a data processing unit that processes the object data into a process data in accordance with the request data, and a transmission unit that transmits the process data to the electronic device. The control program includes the programs of a) inputting an object data, b) transmitting a request data and the object data to the server via a network, c) receiving a process data into which the server has processed the object data in accordance with the request data, and d) outputting the process data.

BRIEF DESCRIPTION OF THE DRAWINGS

In the drawings:

FIG. 5(a) is an explanatory diagram illustrating data structure of a RAM of a main unit shown in FIG. 4;

FIG. 5(b) is an explanatory diagram illustrating data structure of a ROM of the main unit;

FIG. 5(c) is an explanatory diagram illustrating data structure of a destination data storage unit of the RAM of FIG. 5(a);

FIG. 6(a) is an explanatory diagram showing data structure in RAM a web printing unit shown in FIG. 4;

FIG. 6(b) is an explanatory diagram showing data structure in a ROM of the web printing unit;

FIG. 6(c) is an explanatory diagram showing data structure of a URL data storage unit of FIG. 6(a);

FIG. 7 is a flowchart representing a process executed by the CPU 111 in the web printing unit for recording URL-memo data;

FIG. 8 is an explanatory diagram illustrating the data structure of the flag data of FIG. 6(b);

FIG. 9 is an explanatory diagram showing a system according to the embodiment;

FIG. 11 is a flowchart representing the 2-in-1 copy process of FIG. 10(a) in detail;

PREFERRED EMBODIMENTS OF THE PRESENT INVENTION

Next, preferred embodiments of the present invention will be described while referring to the accompanying drawings.

Figure 1:
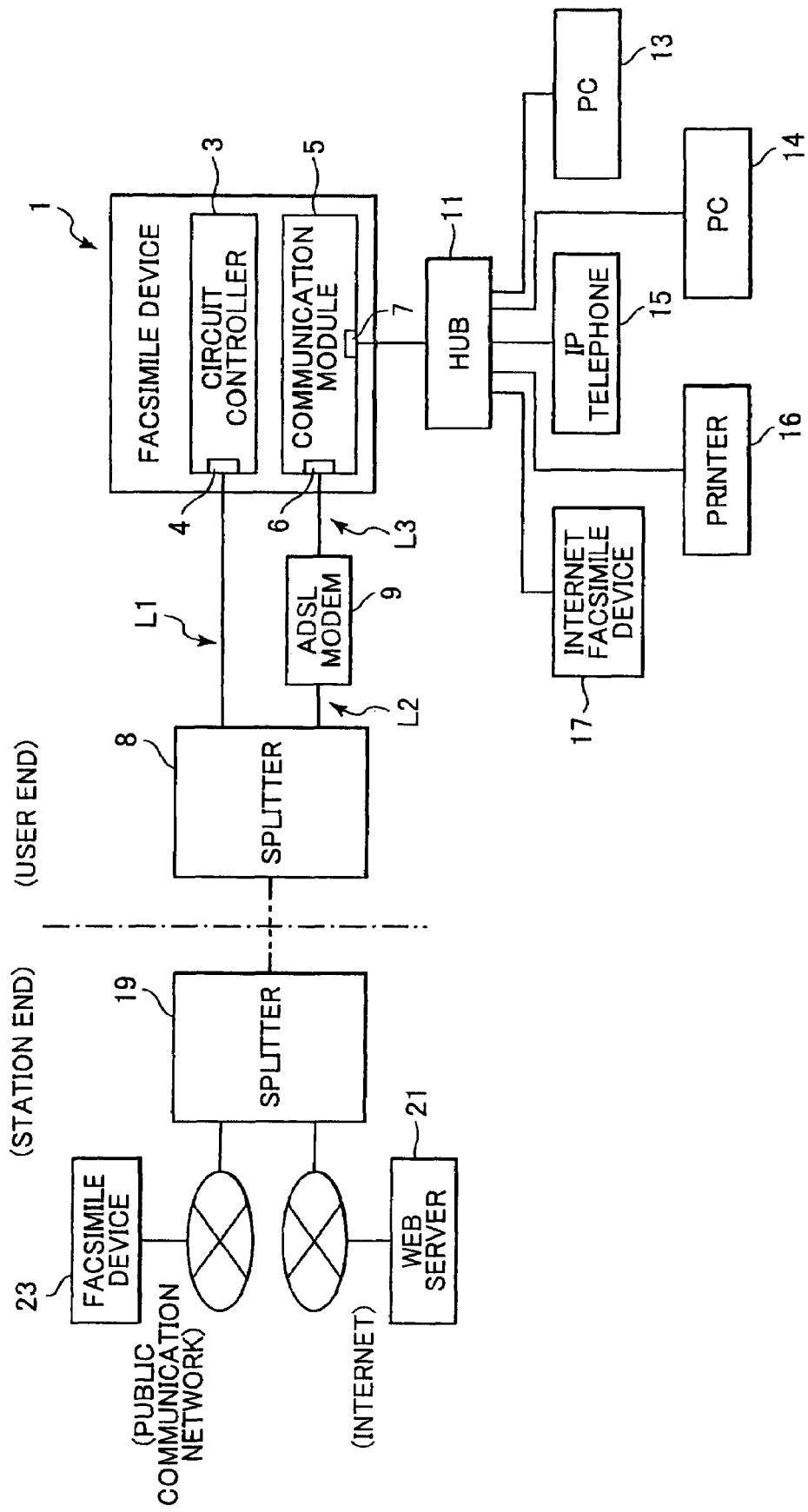
FIG. 1 is a block diagram showing an example of using a facsimile device according to an embodiment of the present invention.
Figure 2:
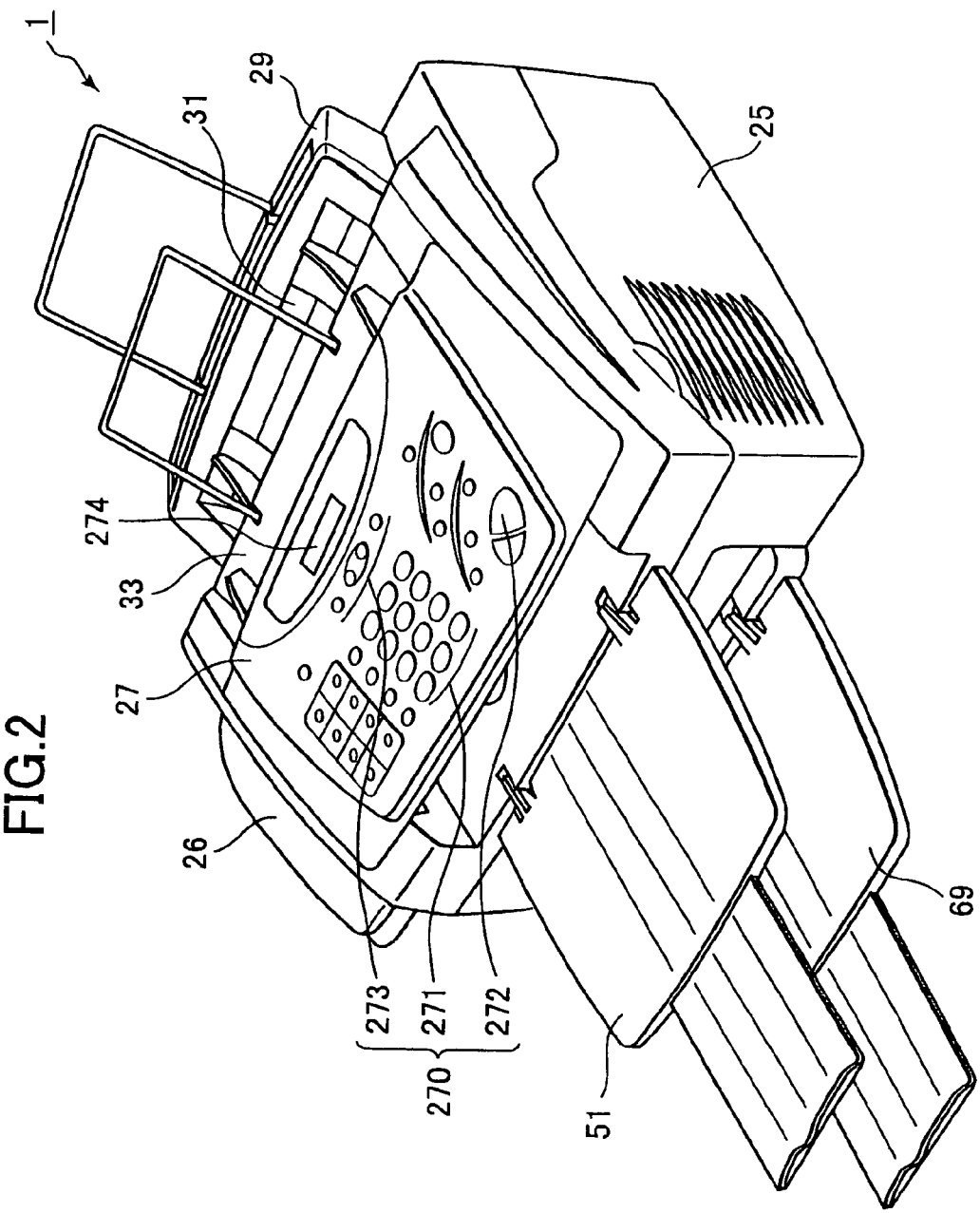
FIG. 2 is a perspective view showing an external construction of the facsimile device.
Figure 3:
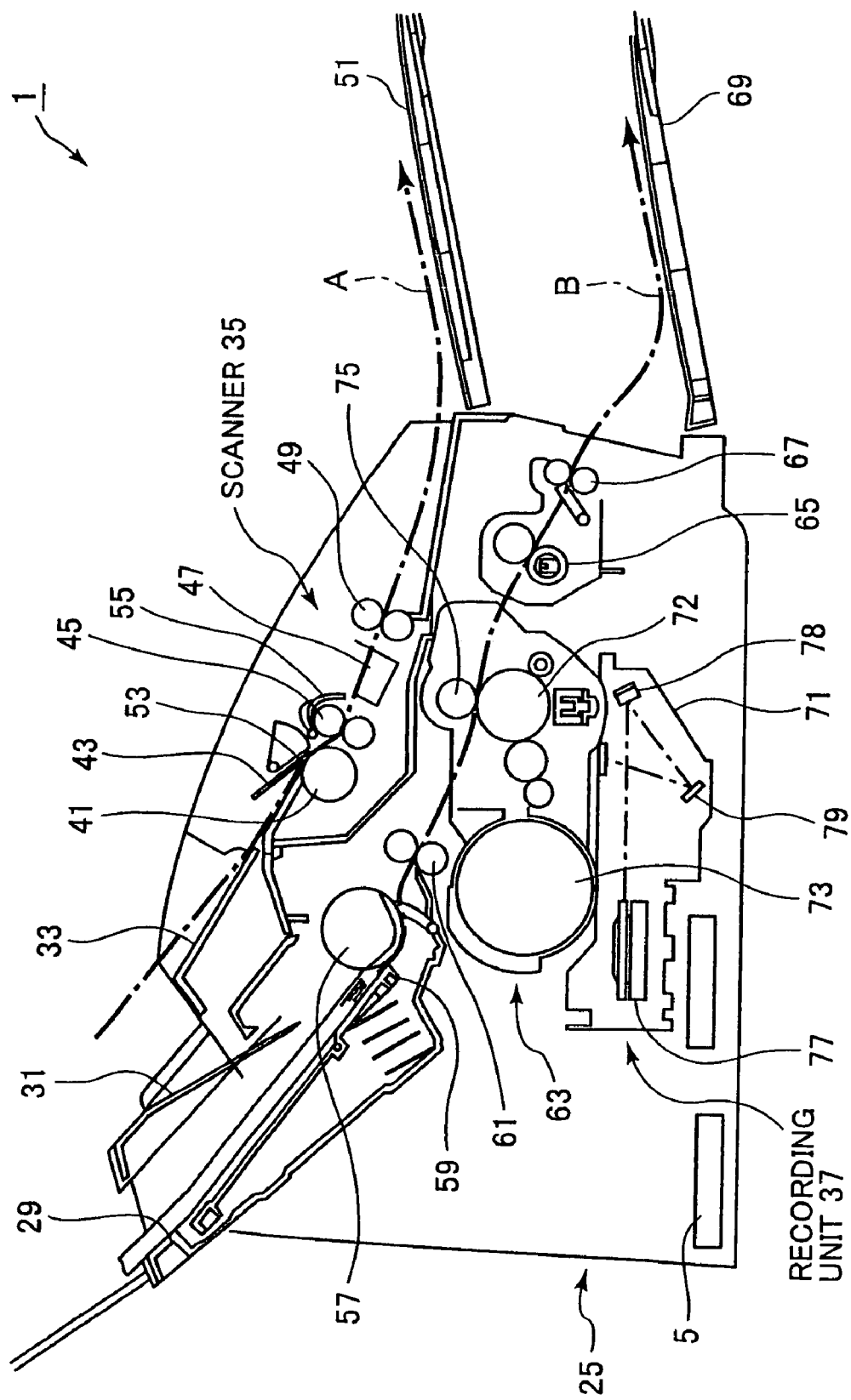
FIG. 3 is an explanatory diagram showing an internal construction of the facsimile device.

FIG. 1 is a block diagram illustrating an example of using a facsimile device 1 applying the present invention. FIG. 2 is a perspective view showing the overall external configuration of the facsimile device 1. FIG. 3 is a side cross-sectional view showing the internal construction of the facsimile device 1.

As shown in FIG. 1, the facsimile device 1 includes a circuit controller 3 and a communication module 5. The circuit controller 3 is provided with an external connection port 4. An analog line L1 (a telephone line formed of either two or four leads) connects between the external connection port 4 and a telephone connection port on a splitter 8 provided in a home office or other building.

The communication module 5 is provided with a WAN connection port 6 and a LAN connection port 7. The WAN connection port 6 is connected to an ADSL modem 9 via a LAN cable L3. The LAN connection port 7 is connected to a hub 11. The ADSL modem 9 is connected to an ADSL modem connection port in the splitter 8 via a LAN cable L2.

LAN terminals 13 through 17 are connected to the hub 11. The LAN terminals include a plurality of personal computers 13 and 14 capable of performing bi-directional communications, a printer 16, such as an inkjet printer or laser printer capable of connecting to a network, an IP telephone 15 capable of transmitting voice signals by Internet Protocol, and an Internet facsimile device 17 capable of connecting to the Internet. In other words, the hub 11 is connected to a local area network (LAN) provided in a building and configured of the above-described LAN terminals 13 through 17.

The splitter 8 is a device used for ADSL well known in the art. The splitter 8 is configured to receive a transmission signal from a splitter 19 provided on the base station end. The transmission signal includes a first signal of about 4 kHz or less superimposed on a second signal of a higher frequency for ADSL. The splitter 8 separates the first and second signals and outputs the first signal to the telephone connection port and the second signal to the ADSL modem connection port. The splitter 8 also superimposes signals received via these connection ports and transmits the superimposed signal to the splitter 19 on the base station end.

That is, the facsimile device 1 of the present embodiment can connect to a subscriber telephone on a public communication network (that is, a public switching telephone network:PSTN) using the circuit controller 3. The facsimile device 1 can also connect to the Internet serving as a wide area network (WAN) via the communication module 5 and the ADSL modem 9.

Through operations of a router controller 101 (FIG. 4) provided in the communication module 5, the facsimile device 1 functions as a router for routing data (IP packets) that is transmitted and received between a communication device on the Internet (such as a web server 21) and the LAN terminals 13 through 17 on the LAN.

The facsimile device 1 of the present embodiment has a facsimile function, a printer function, and a copy function. The facsimile function optically scans images from an original document, converts image data representing the scanned image into facsimile data, and transmits the facsimile data via the analog line L1 to an external facsimile device 23 connected to the public communication network. The facsimile function also receives facsimile data transmitted from the external facsimile device 23 via the public communication network and the analog line L1, and forms images on a recording sheet based on the facsimile data.

The printer function is a function for forming images on a recording sheet based on code data transmitted by a word processor or the personal computer 13 or 14. When the facsimile device 1 receives code data from an external personal computer via a PC interface 24 (FIG. 4) or from the personal computer 13 or 14 on the LAN via the communication module 5, the facsimile device 1 forms images based on the code data on recording sheet. The copy function is a photocopying function for scanning images from an original document using a scanner 35 and a recording unit 37 (described later) and forming images on recording sheet based on the image data.

As shown in FIG. 2, the facsimile device 1 having the functions described above includes an outer case 25, a handset 26 mounted on the side of the outer case 25, and an operating panel 27 provided on the front portion of the top surface of the outer case 25. The operating panel 27 is provided with various operating keys 270 including numeral keys 271 for inputting the telephone number (fax number) of other parties, a start key 272, and a select key 273, and a liquid crystal display (LCD) 274 for displaying data related to the various functions.

In addition, a first paper tray 29 for accommodating recording sheet to be fed into the device is provided on the top back portion of the outer case 25. A second paper tray 31 is provided above the first paper tray 29 to enable the user to feed recording sheet by hand. An original document feed tray 33 is provided above the second paper tray 31 for accommodating original documents to be scanned.

As shown in FIG. 3, the outer case 25 accommodates the scanner 35 for scanning images from an original document, the recording unit 37 for forming multicolor images on recording sheet, and a circuit board (not shown) on which a CPU 39 (FIG. 4) is mounted for controlling the scanner 35 and recording unit 37.

In the scanner 35, a document sensor (not shown) detects an original document placed in the original document feed tray 33. A feed mechanism formed of a feed roller 41, a separating pad 43, and the like picks up the original document one sheet at a time and feeds the document in a direction of an arrow A in FIG. 3. A conveying roller 45 conveys the original document to a scanning unit 47. The scanning unit 47 scans the images formed on the original document. After being scanned by the scanning unit 47, the original document is discharged by a discharge roller 49 onto a first discharge tray 51 provided on the front of the outer case 25.

In addition to the document sensor described above, the scanner 35 is provided with a leading edge sensor 53 for detecting the leading edge of the document and a trailing edge sensor 55 for detecting the trailing edge of the document. The CPU 39 regulates the document feeding process by controlling each unit in the scanner 35 based on detection results from these sensors 53, 55 in order to execute the operations of the scanner 35.

In the recording unit 37, a feed mechanism formed of a feed roller 57, a separating pad 59, and the like picks up recording sheet loaded in either the first paper tray 29 or the second paper tray 31 one sheet at a time, and feeds the recording sheet in a direction of an arrow B in FIG. 3. A conveying roller 61 conveys the sheet of recording sheet to an image forming device 63. The image forming device 63 forms multicolor images on the recording sheet by using toner of a plurality of colors (in the present embodiment, cyan, magenta, yellow, and black). After passing the image forming device 63, the recording sheet is conveyed downstream to a fixing device 65. The fixing device 65 fixes the toner image on the recording sheet. After further passing through the fixing device 65, the recording sheet is discharged by a discharge roller 67 onto a second discharge tray 69 provided on the front of the outer case 25.

The image forming device 63 operates a laser scanning device 71 to irradiate laser light on a photosensitive drum 72 and form electrostatic latent images on the surface thereof. The laser scanning device 71 includes a laser emitting unit 77 for emitting laser light based on image data according to commands from the CPU 39, a lens 78 for reflecting laser light, a reflecting mirror 79 for guiding light reflected by the lens 78 onto the photosensitive drum 72, and the like. The image forming device 63 further includes a toner tank 73 storing toner. After an electrostatic latent image is formed on the photosensitive drum 72, toner from the toner tank 73 is selectively deposited on the photosensitive drum 72. A transfer roller 75 applies an electrical charge to the recording sheet in order to transfer the toner deposited on the photosensitive drum 72 to the recording sheet. Note that the diagram of the image forming device 63 shown in FIG. 3 is a conceptual drawing for describing the functions of the image forming device 63. That is, the image forming device 63 is configured of an image forming device well known in the art for forming color toner images. A toner image for each color is formed as described above, and the toner images are superimposed on one another to form a multicolor image.

Next, the electrical configuration of the facsimile device 1 will be described.

Figure 4:
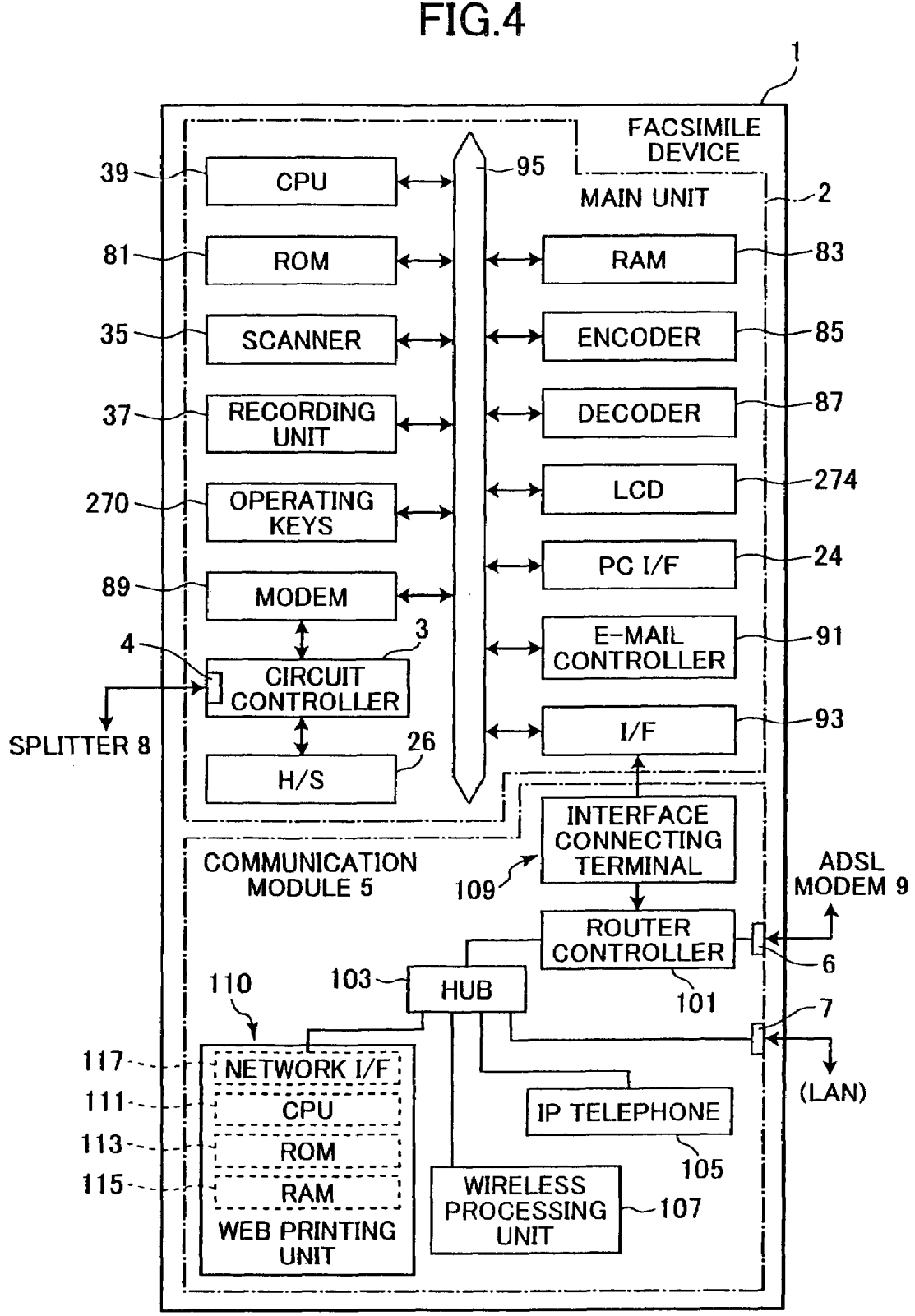
FIG. 4 is a block diagram showing an electrical configuration of the facsimile device.

As shown in FIG. 4, the facsimile device 1 primarily includes the CPU 39, a read only memory (ROM) 81, a random access memory (RAM) 83, the scanner 35, an encoder 85, the recording unit 37, a decoder 87, the operating keys 270, the LCD 274, a modem 89, the circuit controller 3, the PC interface 24, an e-mail controller 91, and a function expansion interface 93. All of these components are connected via a bus 95, and defining a main unit 2. The communication module 5 is connected to the function expansion interface 93.

The CPU 39 serves as the control center of the facsimile device 1 by performing overall control of the facsimile device 1. For example, the CPU 39 reads programs for control processes that are prestored in the ROM 81 and executes processes, such as transmission and reception of facsimile data and as address entry, according to these programs.

As shown in FIG. 5(b), the ROM 81 stores a facsimile function program group 81a, a printer function program group 81b, a recording unit control program 81c, various other programs not shown in the drawing, and various data required when executing these programs.

The facsimile function program group 81a is for operating the facsimile device 1 as a facsimile device. For example, the facsimile function program group 81a includes a reception program for forming images with the recording unit 37 based on facsimile data that the circuit controller 3 receives from the external facsimile device 23.

The printer function program group 81b is for operating the facsimile device 1 as a printer. For example, the printer function program group 81b includes a PC printing program for forming images using the recording unit 37 based on data that the communication module 5 receives from the personal computer 13 or 14 on the LAN.

The recording unit control program 81c is called by the above programs and the like.

As shown in FIG. 5(a), the RAM 83 functions as a work memory 83a that is necessary for performing various control processes, a transmission/reception data storing unit 83b for storing facsimile data and the like, and a destination data storage unit 83c for storing destination data related to the transmission destination of the facsimile data.

As shown in FIG. 5(c), the destination data storage unit 83c can store telephone numbers as destination data for the transmission destination of facsimile data and can also store e-mail addresses in association with these telephone numbers. That is, the facsimile device 1 is capable of storing both a telephone number and e-mail address for each destination in case of when another device (external facsimile device 23) is not only capable of transmitting and receiving facsimile data via a public communication network, but also is capable of transmitting and receiving e-mail via the Internet.

The scanner 35 functions to scan an original document when copying or transmitting facsimile data or the like. As described above, the scanner 35 of the present embodiment is configured to pick up the original document from the original document feed tray 33, scan the images with the scanning unit 47, and output image data to the encoder 85 and the like as scanning results.

The encoder 85 executes an encoding process for converting image data scanned by the scanner 35 into G3 compressed image data in a facsimile format, and outputs the converted image data. The decoder 87 decodes image data in the facsimile format for converting into image data that can be processed by the recording unit 37.

As described above, the recording unit 37 functions as a color laser printer capable of forming color images. The recording unit 37 uses the image forming device 63 to print color images on a recording sheet based on image data decoded by the decoder 87 and according to instruction from the CPU 39 executing the recording unit control program 81c and outputs the recording sheet after the printing process.

The recording unit 37 is provided with a normal print mode and a quiet print mode capable of printing images with less noise than the normal print mode. The recording unit 37 switches between these modes according to instructions from the CPU 39. The recording unit 37 is also capable of performing monochrome printing and can form images using only a specified color of toner according to instruction from the CPU 39.

The operating keys 270 function to input instruction signals into the device (the CPU 39 and the like) based on operations by the user in order to perform such operations as entering destination data, specifying a destination, and inputting or selecting memo data.

The LCD 274 functions as a display device for displaying various messages and the like, including error messages and messages for guiding the user steps of an operation. The LCD 274 of the present embodiment also functions as a touch panel. When the user is specifying a destination for facsimile data or entering destination data, the LCD 274 displays one-touch keys and acquires and inputs user-inputted data into the device.

The modem 89 functions to transmit and receive facsimile data to and from the external facsimile device 23 connected to the public communication network via the circuit controller 3 and the splitter 8. The circuit controller 3 functions to transmit dialing signals to the public communication network, to answer calling signals from the public communication network, and the like. For example, the circuit controller 3 connects to and can communicate with the external facsimile device 23 via the public communication network.

The PC interface 24 is employed when connecting a personal computer to the facsimile device 1 via a parallel interface or the like and functions to receive code data and the like from the personal computers 13 and 14. The e-mail controller 91 transmits and receives facsimile data via email by transmitting and receiving e-mail to and from an external communication device connected to the Internet.

In other words, the e-mail controller 91 converts binary image data in a fax format, which was encoded by the encoder 85, into text-coded image data, and adds header data including the e-mail address for the transmission destination and the like to the converted image data. In this manner, the e-mail controller 91 converts the image data in a fax format into image data in an e-mail format that can be transmitted as e-mail. Similarly, the e-mail controller 91 converts image data in an e-mail format received via the Internet and the communication module 5 back to image data in a fax format. The image data converted back in a fax format in this manner is then decoded by the decoder 87 so that the recording unit 37 can output, and the recording unit 37 prints out the data on recording sheet.

The function expansion interface 93 is a serial interface, such as AIO (Analog Input/Output) or RS232C. The separate communication module 5 including the router controller 101 can be detachably connected to the function expansion interface 93. The communication module 5 is accommodated in the outer case 25 of the facsimile device 1, as shown in FIG. 3.

The communication module 5 includes the router controller 101, a hub 103, an IP telephone unit 105, a wireless processing unit 107, a web printing unit 110, an interface connecting terminal 109 connected to the router controller 101, and the like. The communication module 5 is connected to the function expansion interface 93 via the interface connecting terminal 109.

The router controller 101 is for transmitting and receiving IP packets between a communication device on the Internet via the ADSL modem 9, and functions as a broadband router well known in the art, having an IP masquerade function and a routing function. Using the IP masquerade function, the router controller 101 can convert both ways between a private IP address used on a LAN and a global IP address used on a WAN (the Internet in the present embodiment). Using the routing function, the router controller 101 can connect a terminal on the LAN end to a communication device on the WAN end (the web server 21) to perform bi-directional communications.

For example, by transmitting and receiving data with the IP telephone unit 105, the wireless processing unit 107, and the web printing unit 110 via the hub 103, the router controller 101 can connect the IP telephone unit 105, the wireless processing unit 107, and the web printing unit 110 to the Internet via the ADSL modem 9 for performing bi-directional communications.

Further, by communicating with the LAN terminals 13 through 17 on the LAN connected to the LAN connection port 7 via the hub 103, the router controller 101 can connect the LAN terminals 13 through 17 to the Internet for performing bi-directional communications. In other words, the router controller 101 controls communication routes and transmits data received from the web server 21 to the destination LAN terminals 13 through 17 for example.

In addition, the router controller 101 can communicate with the CPU 39 of the main unit 2 via the function expansion interface 93. In other words, the LAN terminals 13 through 17, the IP telephone unit 105, the wireless processing unit 107, and the web printing unit 110 can communicate bi-directionally with the CPU 39 of the main unit 2 via the router controller 101 and the function expansion interface 93. For example, if the CPU 39 acquires print code data from the personal computer 13 or 14 on the LAN via the router controller 101, then the CPU 39 executes the printer function program, calls the recording unit control program 81c within this program, and controls the recording unit 37 to form images based on the data.

The IP telephone unit 105 connected to the router controller 101 via the hub 103 is configured to store voice signals in IP packets and execute voice communications (a call) with an external IP telephone via the Internet.

The wireless processing unit 107 functions to perform wireless communications between an external wireless communication device and the facsimile device 1. The wireless processing unit 107 can connect an external wireless communication device to the components in the facsimile device 1 for performing bi-directional communications using a wireless connecting method that conforms with the Bluetooth standard (close-range wireless communication standard) or the IrDA standard (infrared communication standard) For example, the LAN terminals 13 through 17 can each be connected to the facsimile device 1 by a wired connecting method using the LAN connection port 7 connected to the hub 103. In addition, the LAN terminals 13 through 17 can be connected to the facsimile device 1 by a wireless connecting method using the wireless processing unit 107.

The web printing unit 110 includes a CPU 111, a ROM 113, a RAM 115, a network interface 117, and the like. The web printing unit 110 can connect itself to the Internet or communicate with the CPU 39 of the main unit 2 by communicating with the router controller 101 via the network interface 117.

FIG. 6(a) is an explanatory diagram showing the data structure in the RAM 115 of the web printing unit 110. FIG. 6(b) is an explanatory diagram showing the data structure in the ROM 113.

As shown in FIG. 6(a), the RAM 115 in the web printing unit 110 functions as a work memory 115a, a transmission/reception data storage unit 115b for storing data downloaded from the web server 21 and the like, a URL data storage unit 115c for storing URL (Uniform Resource Locator) data indicating the address of the web server 21, a transfer destination data storage unit 115d for storing transfer destination data regarding the destination to which data is transferred when using a transfer function (described later), an access prohibited database 115e (described later), a keyword database 115f, a history data storage unit 115g, a log storage unit 115h, and the like.

As shown in FIG. 6(c), the URL data storage unit 115c can store a plurality of entries of memo data and scheduler settings data in association with the URL representing the address for accessing the data. In other words, the communication module 5 stores memo data, which the user inputs externally through operations on the operating panel 27 and the like, in association with corresponding URLs into the associations in the URL data storage unit 115c. As is well known in the art, a URL is address data configured of a server address, directory data, filename, and the like.

Next, a process for storing URL-memo data will be described with reference to the flowchart of FIG. 7. The process for storing URL-memo data is executed by the CPU 111 in the web printing unit 110 for storing memo data in association with corresponding URL in the above-described manner.

As shown in FIG. 7, when the process for storing URL-memo data is started, first in S101, the CPU 111 transmits an input instruction to the main unit 2 via the function expansion interface 93, controlling the LCD 274 to display input instruction prompting the user to input a URL and memo data. In S103, the CPU 111 determines whether or not an instruction for storing a URL and memo data was received from the operating panel 27 via the function expansion interface 93. If not (S103:NO), then the process waits until the instruction is received. On the other hand, if so (S103: YES), then in S105, the CPU 111 acquires the URL and the memo data, which have been input from the operating panel 27, from the main unit. Next in S107, the CPU 111 associates the URL with the memo data, and stores the URL and the memo data in the URL data storage unit 115c, and then the process ends.

Here, the memo data is provided to enable the user to quickly determine a desired URL, since it is difficult to determine what home page to access only by the URL display and moreover it is not easy to search for a desired URL because the display area of the LCD 274 is limited.

As shown in FIG. 6(d), the transfer destination data storage unit 115d is configured to store address data for a printer transfer and address data for a personal computer transfer (described later). The transfer destination data storage unit 115d stores a port number along with a private IP address on the LAN as the address data for printer transfers and personal computer transfers.

As shown in FIG. 6(b), the ROM 113 in the web printing unit 110 stores a program group 113a for a web printing function, flag data 113b, and the like. The program group 113a are for acquiring data from the web server 21 and for controlling the recording unit 37 of the facsimile device 1 to print the acquired data. The flag data 113b represents operating conditions of the web printing function.

More specifically, the web printing unit 110 includes a printing function for controlling the recording unit 37 to print images based on data downloaded from the web server 21 via the router controller 101; a saving function for temporarily saving data in the RAM 115; a printer transferring function for transferring downloaded data to the printer 16 (a printer identified by address data stored in the transfer destination data storage unit 115d as the printer transfer destination) connected to the LAN via the LAN connection port 7; a personal computer transferring function for transferring downloaded data to the personal computers 13 and 14 connected to the LAN via the LAN connection port 7; a monochrome printing function for instructing the recording unit 37 to print monochrome images based on downloaded data; a quiet printing function for controlling the recording unit 37 to print images based on the downloaded data in the quiet print mode for suppressing device noise during the printing process; a log saving function for saving log data for various processes executed by the web printing unit 110; and an error data displaying function for displaying error messages on the LCD 274. These functions are implemented by the program group 113a stored in the ROM 113. The functions can be toggled ON and OFF based on flags set in flag setting data stored in the RAM 115. Details will be described below.

The web printing unit 110 stores flag setting data into the RAM 115 according to prescribed conditions in a following manner. FIG. 8 is an explanatory diagram illustrating the data structure of the flag data 113b stored in the ROM 113. According to prescribed conditions, the web printing unit 110 selects one of operating modes shown in FIG. 8. The operating modes include a "normal" operating mode, a "URL access not authorized" operating mode, a "cancel print" operating mode, a "password error" operating mode, a "keyword error" operating mode, a "same content detected" operating mode, a "nighttime print" operating mode, an "answering machine" operating mode, a "large volume monochrome printing" operating mode, an "out-of-paper error" operating mode, and an "out-of-toner error" operating mode.

Then, the web printing unit 110 retrieves function values (hereinafter referred to as "flag values") of the selected operating mode, and stores the retrieved flag values into the RAM 115 as the flag setting data. The web printing unit 110 operates the function (ON) when the flag value is "1" or greater and prevents operation of the function (OFF) when the flag value is "0". The asterisk (*) symbol appearing in FIG. 8 indicates that the flag value stored as the flag setting data prior to selecting the operating mode cannot be overwritten.

Next, various processes (the program group 113a) executed by the CPU 111 will be described with reference to FIGS. 9 through 28.

Next, a system according to the present embodiment will be described. As shown in FIG. 9, a system 301 according to the present embodiment includes a client terminal 302 and a proxy server 303 connected to each other via the Internet, such as the World Wide Web. Although only a single proxy server 303 is shown in FIG. 9, multiple proxy servers may be provided.

The client terminal 302 corresponds to the facsimile device 1, and the proxy server 303 corresponds to the web server 21. The client terminal 302 is capable of communicating with the proxy server 303 via the communication module 5 (FIG. 4).

The proxy server 303 of the present embodiment includes a CPU 303A, a communication unit 303B, a memory 303C, a ROM 303D, an editor 303E, an optical character reader (OCR) 303F, a voice-to-text converter 303G, and a text-to-voice converter 303H. The CPU 303A is for executing overall control of the proxy server 303. The communication unit 303B is for bi-directionally communicating with the client terminal 302. The memory 303C provides a working area for temporarily storing various data. The ROM 303D stores various programs, text data, voice data, and the like. The editor 303E is for editing various data. The voice-to-text converter 303G converts voice data into text data, and the text-to-voice converter 303H converts voice data into text data.

In the system 301 of the present embodiment, a user of the client terminal 302 can select one of "compact copy function" mode, "OCR function" mode, "voice-to-text conversion function" mode, and "text-to-voice conversion function" mode. Then, the proxy server 303 performs one of the compact copy function using the editor 303E, the OCR function using the OCR 303F, the voice-to-text conversion function using the voice-to-text converter 303G, and the text-to-voice conversion using the text-to-voice converter 303H, which require large resources, in accordance with the selected mode.

First, a process executed in the system 301 when the "compact copy function" mode is selected will be described. In this process, the CPU 303A of the proxy server 303 performs a compact copy function using the editor 303E to integrate multiple-page-worth of original data read by the client terminal 302 into a single-page-worth of print data, enabling the client terminal 302 to print the multiple-page-worth of original data on a single page of recording sheet based on the integrated print data.

In the following example, a 2-in-1 copy process will be described, wherein two-page-worth of original data is printed in a compact form on a single page of recording sheet. Programs for executing the 2-in-1 copy process are stored on the client terminal 302 and the proxy server 303.

Figure 10A:
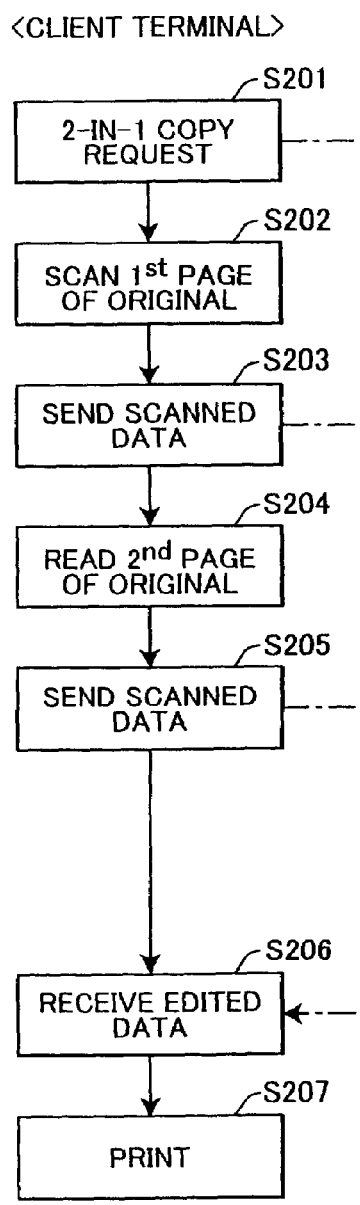
FIG. 10(a) is a flowchart representing overall 2-in-1 copy process executed by the client terminal.
Figure 10B:
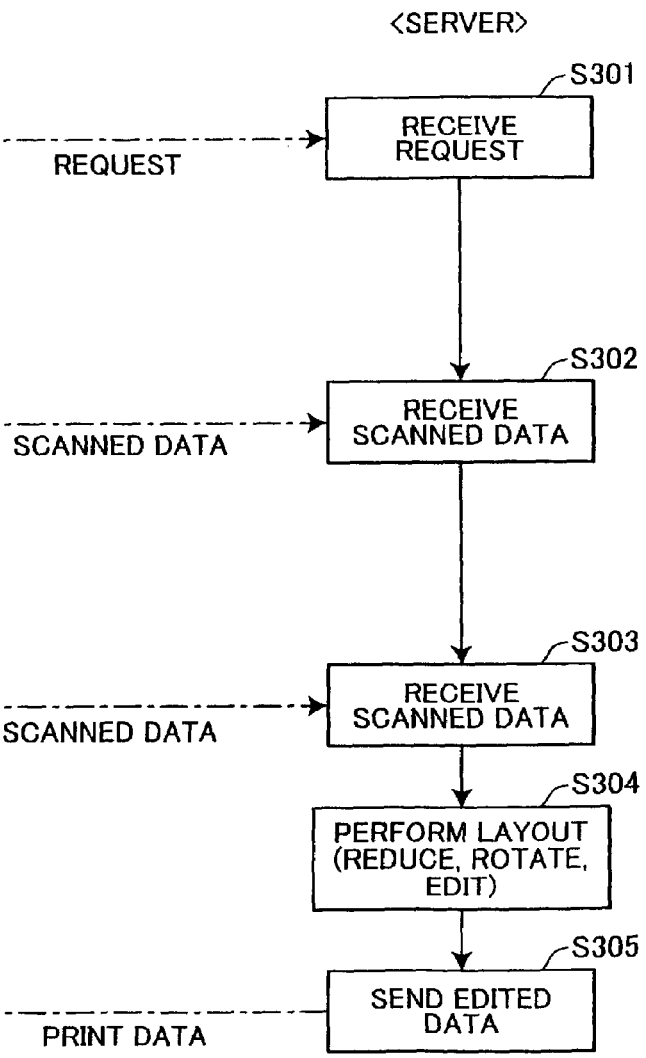
FIG. 10(b) is a flowchart representing overall 2-in-1 copy process executed by the proxy server.

FIG. 10(*a*) is a flowchart representing overall process executed by the client terminal 302, and FIG. 10(*b*) is a flowchart representing overall process executed by the proxy server 303.

First, in S201 of FIG. 10(*a*), the client terminal 302 transmits a 2-in-1 copy request by HTTP protocol to the proxy server 303 specified by a URL inputted through the operating keys 270. Then, in S301 of FIG. 10(*b*), the proxy server 303 receives the 2-in-1 copy request using the communication unit 303B. In S202, the client terminal 302 scans a first page of original document using the scanner 35, and in S203, the client terminal 302 transmits the scanned data in a HTML format to the proxy server 303 by HTTP protocol. In S302, the proxy server 303 receives the scanned data for the first page of the original document. In S204, the client terminal 302 scans the second page of the original document and, in S205, transmits the scanned data for the second page to the proxy server 303. In S303, the proxy server 303 receives the scanned data for the second page.

In S304, the proxy server 303 performs, using the editor 303E, a layout process, such as reduction, rotation, to edit the scanned data for the first and second pages, and combines the scanned data for both pages into edited data for a single page. In S305, the proxy server 303 transmits the edited data for the single page in a HTML format using the HTTP protocol to the client terminal 302. In S206, the client terminal 302 receives the edited data for the single page.

In S207, the client terminal 302 prints the edited data on a single page of recording sheet. Specifically, the edited data received in the HTML format is converted into image data, and images are formed on the recording sheet based on the image data by using a copy function. However, it is also possible to use the facsimile function to convert the HTML data to facsimile data and form images based on the facsimile data, or to use the printer function to convert the HTML data to code data and form images based on the code data.

If there are unscanned pages of the original document, the processes beginning from S202 and S302 are repeated. On the other hand, if there is no more pages left, the process ends. In this way, the system 301 executes the 2-in-1 copy function. FIG. 11 shows a more detailed flowchart of the process executed by the client terminal 302, and FIG. 12 shows a more detailed flowchart of the process executed by the proxy server 303.

First, the process executed by the client terminal 302 will be described in detail. As shown in FIG. 11, first in S211, a 2-in-1 copy request is transmitted to the proxy server 303. In S212, a single page of the original document is scanned, and in S213, the scanned data for the single page is transmitted to the proxy server 303. In S214, it is determined whether or not the scanned data transmitted to the proxy server 303 last time is for an even-numbered page of the original document. If so (S214:YES), then in S215, a request notification data requesting print data (edited data) is transmitted to the proxy server 303. Print data is received in S216 from the proxy server 303 and then printed in S217 on recording sheet. Then, the process proceeds to S218. On the other hand, if the scanned data is not for an even-numbered page of the original document (S214:NO), then the process directly advances to S218.

In S218, it is determined whether or not unscanned pages of the original document remain, using a document sensor (not shown) in the scanner 35 (FIG. 4). If so (S218:YES), then the process returns to S212. On the other hand, if not (S218:NO), then in S219, it is determined whether or not the scanned data transmitted to the proxy server 303 last time is for an odd-numbered page of the original document. If so (S219:YES), then in S220, a request notification data requesting print data is transmitted to the proxy server 303. In S221, print data is received from the proxy server 303, and in S222, the print data is printed on recording sheet. Then, the process proceeds to S223. On the other hand, if the scanned data transmitted to the proxy server 303 last time is not for an odd-numbered page (S219:NO), then the process directly advances to S223. In S223, a completion notification data is transmitted to the proxy server 303, indicating that the 2-in-1 copy operation has completed.

Figure 12:
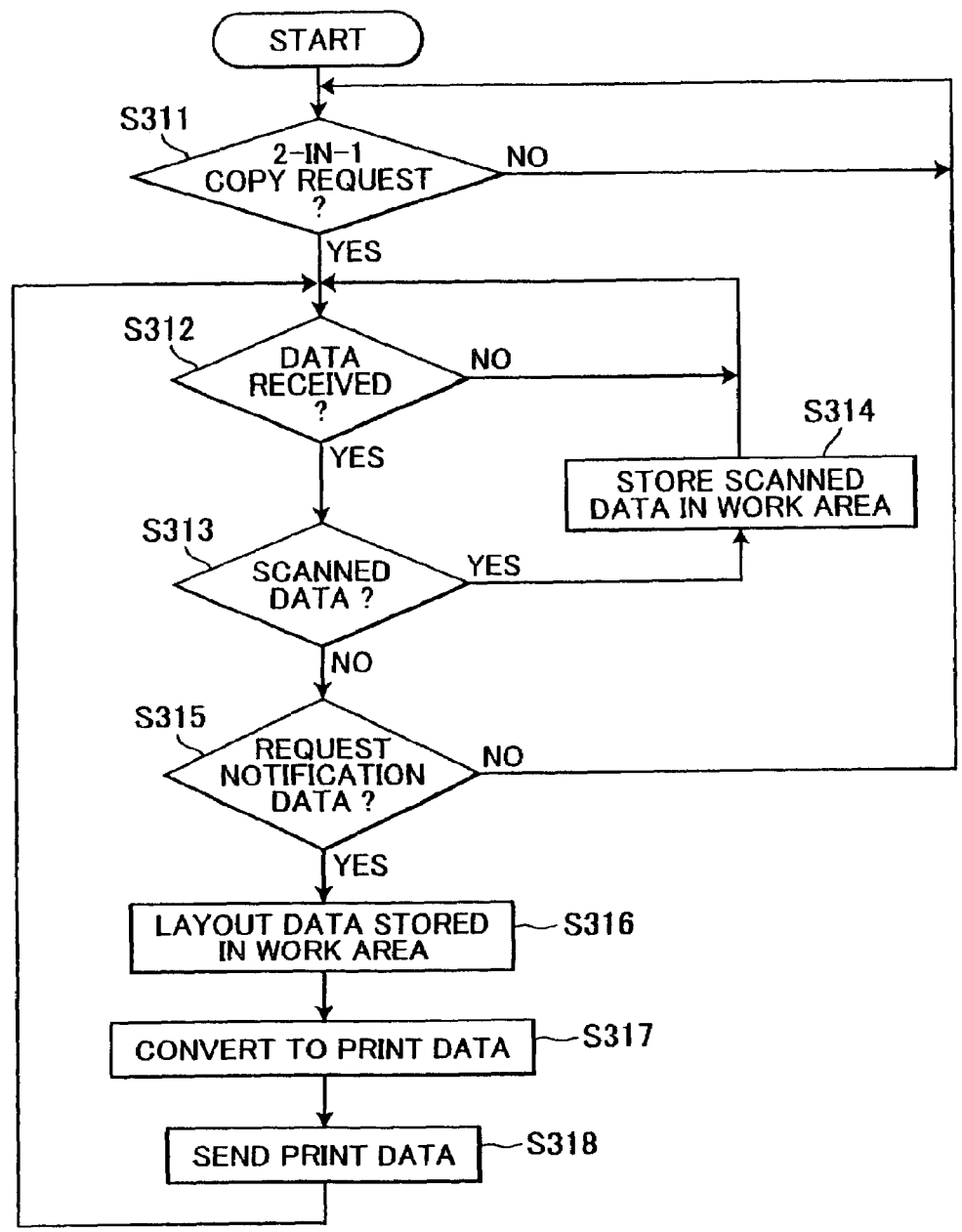
FIG. 12 is a flowchart representing the 2-in-1 copy process of FIG. 10(b) in detail.

In the meantime, the CPU 303A of the proxy server 303 executes the process of FIG. 12. In this process, first in S311, it is determined whether or not a 2-in-1 copy request has been received from the client terminal 302. If not (S311:NO), then the process waits until a positive determination is made. On the other hand, if a 2-in-1 copy request has been received (S311:YES), then in S312, it is determined whether or not data has been received from the client terminal 302.

If not (S312:NO), then the process waits until data is received. On the other hand, if so (S312:YES), then in S313, it is determined whether or not the received data is scanned data. If so (S313:YES), then in S314, the scanned data is stored in a work area on the memory 303E, and the process returns to S312.

On the other and, if the received data is not scanned data (S313:NO), then this means that the received data is notification data. Then in S315, it is determined whether or not the notification data is a request notification data. If not (S315:NO), this means that the received notification data is a completion notification data, and then the process returns to S311.

On the other hand, if the notification data is the request notification data (S315:YES), then in S316, the editor 303E performs a layout process for arranging scanned data stored in the work area by performing reduction, rotation, and other editing operations. In S317, the edited data is converted to a HTML format, and then in S318, the edited data is transmitted as print data to the client terminal 302. Afterwards, the process returns to S312.

While the above example describes the process for the 2-in-1 copy operation, the present invention can also be applied for a 4-in-1 copy operation, a 6-in-1 copy operation, and the like for combining four, six, or more pages of original document into a single page of output document, by modifying the processes in S214 and S219 of FIG. 11, for example.

Next, an optical character recognition (OCR) function of the system 301 that is executed when the "OCR function" model is selected will be described. In the OCR function, the client terminal 302 scans a handwritten document and sends the scanned data to the proxy server 303, which extracts character data from the scanned data, enabling the client terminal 302 to print the character data.

Figures 13A, 13B:
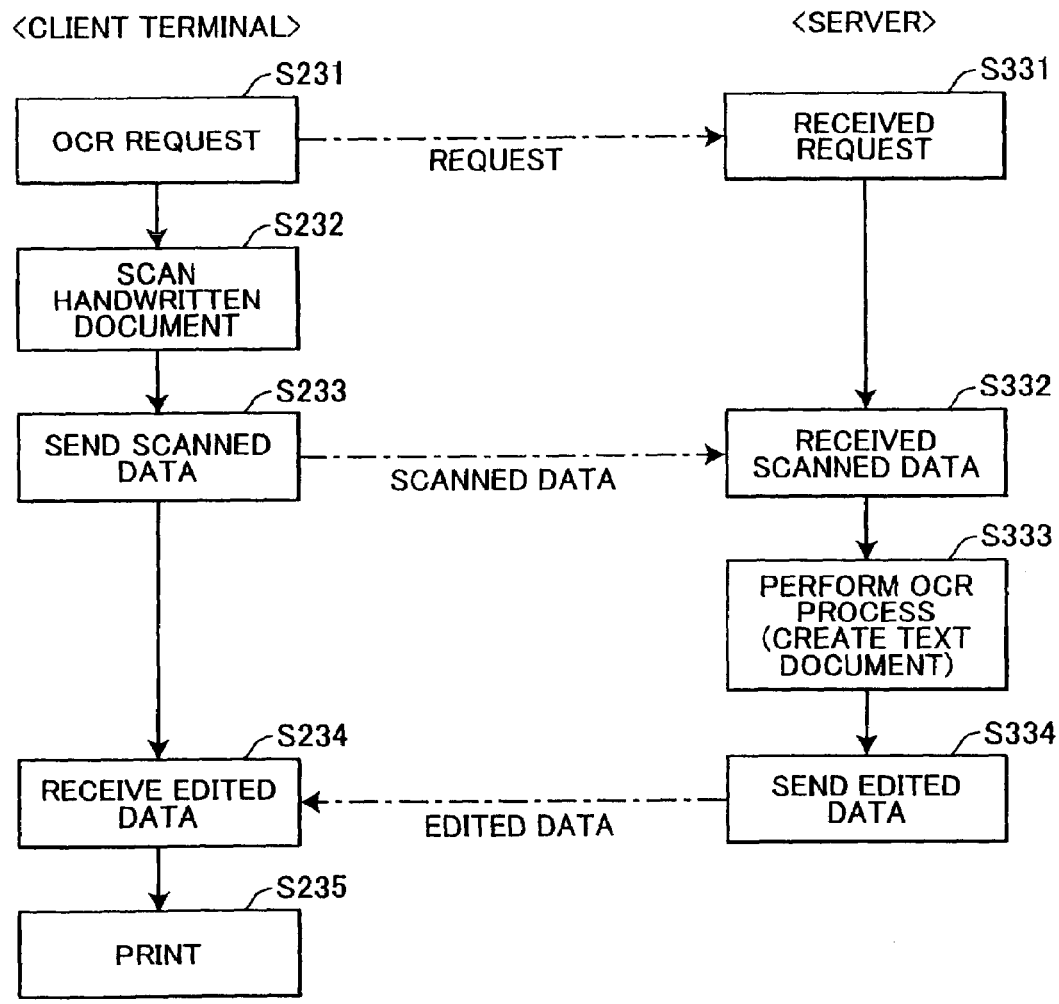
FIG. 13(a) is a flowchart representing overall OCR process executed by the client terminal.
FIG. 13(b) is a flowchart representing overall OCR process executed by the proxy server.

FIG. 13(a) is a flowchart representing an overall process executed by the client terminal 302, and FIG. 13(b) is a flowchart representing an overall process executed by the proxy server 303. Programs for executing the OCR function are stored on the client terminal 302 and the proxy server 303.

In S231 of FIG. 13(a), the client terminal 302 transmits an OCR function request by HTTP protocol to the proxy server 303 specified by a URL that has been input by a user through the operating keys 270 (FIG. 4). As a result, in S331 of FIG. 13(b), the proxy server 303 receives the OCR function request. In S232, the client terminal 302 scans the handwritten document by using the scanner 35, and then in S233, the client terminal 302 converts the scanned data into a HTML format and transmits the scanned data to the proxy server 303 by HTTP protocol. In S332, the proxy server 303 receives the scanned data from the client terminal 302. In S333, the proxy server 303 performs an OCR process on the scanned data to create text data by using the OCR 303F. In S334, the proxy server 303 converts the text data into a HTML format and transmits the text data as edited data to the client terminal 302 by HTTP protocol.

In S234, the client terminal 302 receives the edited data and, in S235, prints the edited data on recording sheet. Specifically, the copy function is used to convert the received edited data in the HTML format into image data and form images based on the image data. However, it is also possible to use the facsimile function to convert the HTML data to facsimile data and form images based on the facsimile data, or to use the printer function to convert the HTML data to code data and form images based on the code data.

Figure 14:
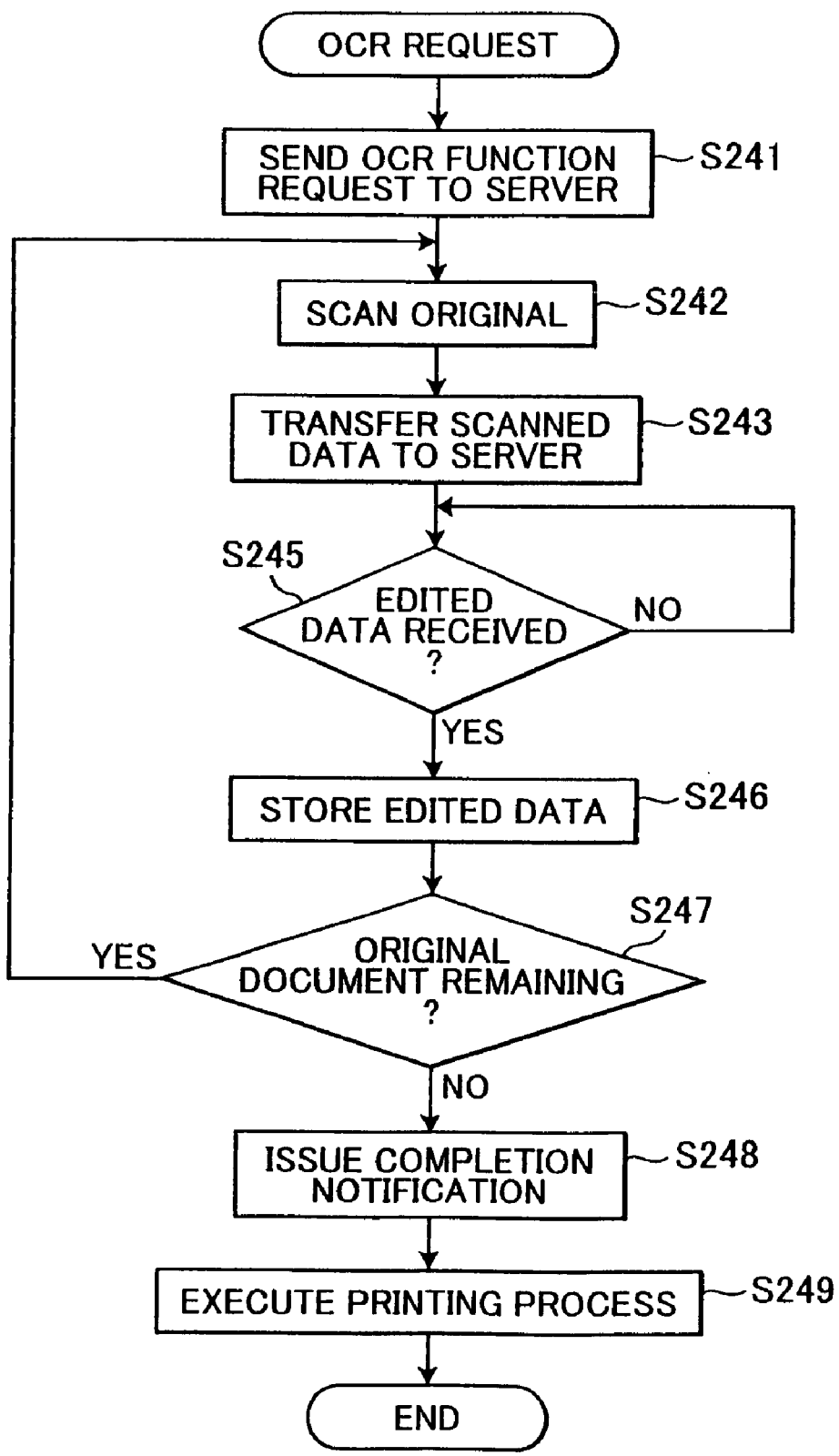
FIG. 14 is a flowchart representing the OCR process of FIG. 13(a) in detail.
Figure 15:
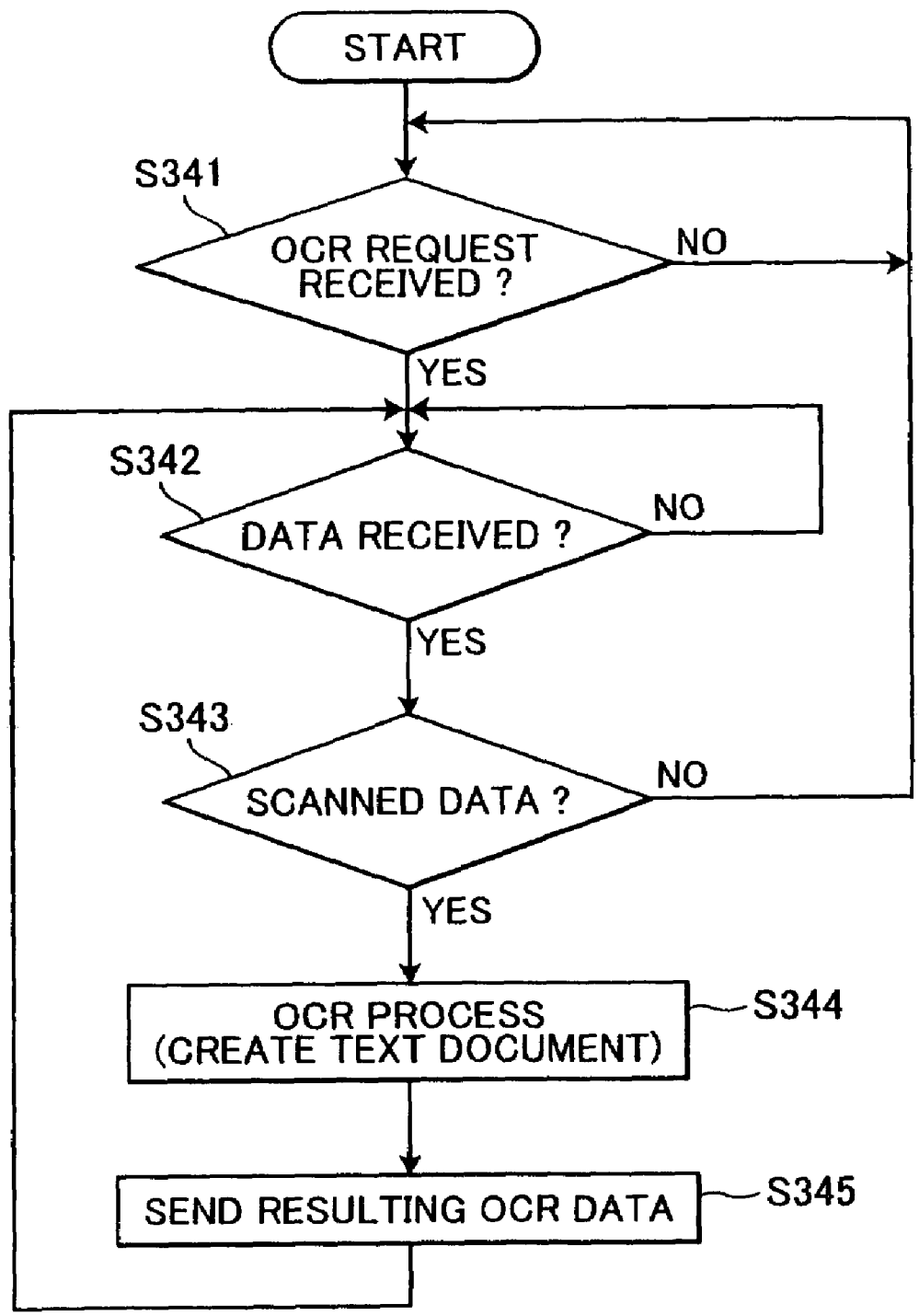
FIG. 15 is a flowchart representing the OCR process of FIG. 13(b) in detail.

FIG. 14 is a flowchart representing more detailed process executed by the client terminal 302, and FIG. 15 is a flowchart representing more detailed process executed by the proxy server 303.

First, the process executed by the client terminal 302 will be described in detail with reference to FIG. 14. First in S241, an OCR function request is transmitted to the proxy server 303. In S242, the handwritten document is scanned, and then in S243, the scanned data of the handwritten document is transmitted to the proxy server 303. In S245, it is determined whether or not edited data has been received from the proxy server 303. If not (S245:NO), then the process waits until edited data is received. On the other hand, if edited data is received (S245:YES), then in S246, the edited data is stored in the RAM 83, the RAM 115, or the like shown in FIG. 4.

In S247, the client terminal 302 determines whether or not more pages of the handwritten document remain using a document sensor (not shown) of the scanner 35 in FIG. 4. If so (S247:YES), then process returns to S242. On the other hand, if not (S247:NO), then in S248, a completion notification data is transmitted to the proxy server 303. In S249, the edited data is printed on recording sheet, and the process ends.

In the meantime, the proxy server 303 executes the process shown in FIG. 15. First in S341, it is determined whether or not an OCR function request has been received from the client terminal 302. If not (S341:NO), then the process waits until a positive determination is made in S341. On the other hand, if so (S341:YES), then in S342, it is determined whether or not data has been received from the client terminal 302.

If data has not been received (S342:NO), then the process waits until data is received. If data has been received (S342:YES), then in S343, it is determined whether or not the received data is the scanned data. If not (S343:NO), then this means the received data is a completion notification data, and then the process returns to S341. On the other hand, if the received data is the scanned data (S343:YES), then in S344, the proxy server 303 performs an OCR process on the scanned data to generate character data (text data) using the OCR 303F. In S345, the proxy server 303 transmits the text data as the edited data to the client terminal 302 according to HTTP protocol.

In the above-described OCR function, the edited data transmitted to the client terminal 302 is printed on recording sheet. However, if the client terminal 302 is also connected to a mail server capable of receiving and transmitting e-mail via the Internet, the client terminal 302 can use the e-mail controller 91 of FIG. 4 to set the edited data as part of an e-mail message.

Next, a voice-to-text conversion function of the system 301 of the present embodiment which is performed when the "voice-to-text conversion" mode is selected will be described. In the voice-to-text conversion function, voice data input into the client terminal 302 is converted into character data by the proxy server 303, enabling the client terminal 302 to transfer the character data to a mail server (not shown) as a part of an e-mail message.

Figure 16A:
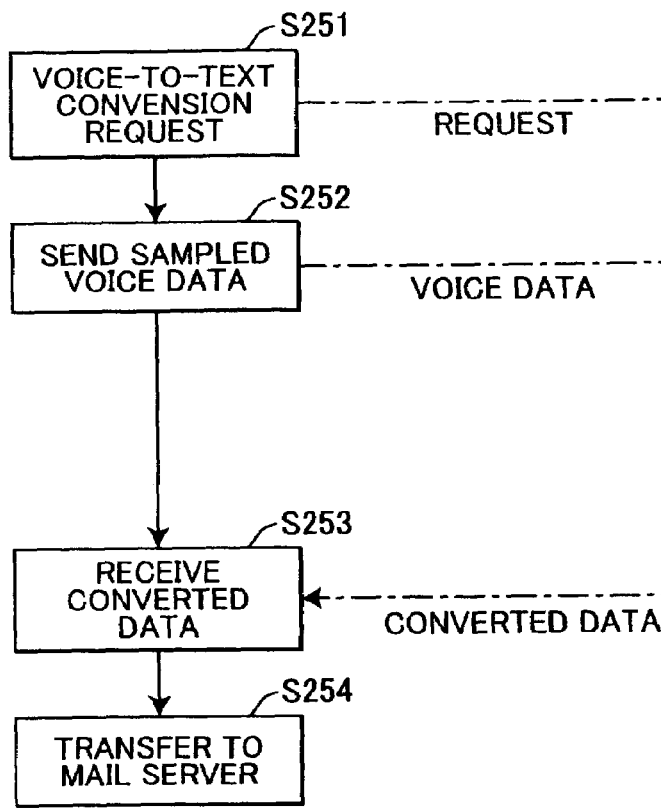
FIG. 16(a) is a flowchart representing overall e-mail transmission process executed by the client terminal.
Figure 16B:
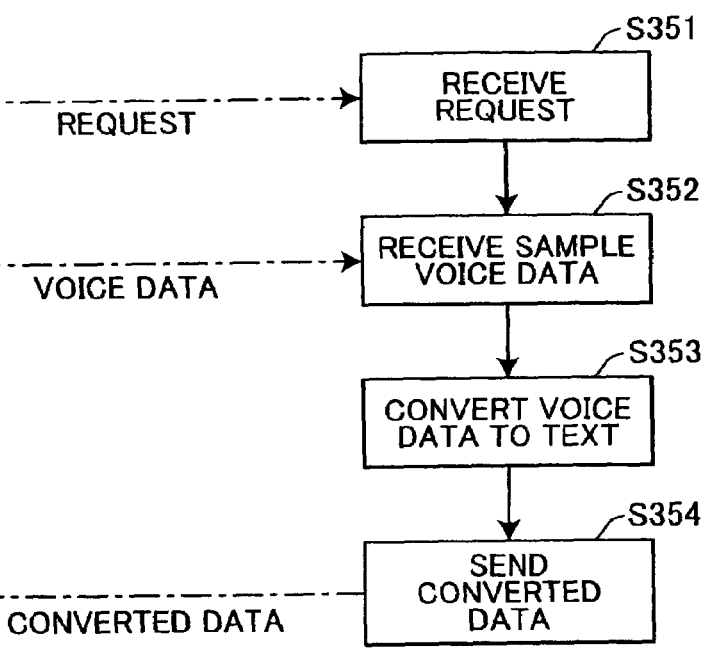
FIG. 16(b) is a flowchart representing voice-to-text process executed by the client terminal.

FIG. 16(a) is a flowchart representing an overall process executed by the client terminal 302, and FIG. 16(b) is a flowchart representing an overall process executed by the proxy terminal 303. Programs for executing the voice-to-text conversion function are stored on the client terminal 302 and the proxy terminal 303.

In S251 of FIG. 16(a), the client terminal 302 transmits a voice-to-text conversion request by HTTP protocol to the proxy server 303 that is specified by a URL that the user input through the operating keys 270. In S351 of FIG. 16(b), the proxy server 303 receives the voice-to-text conversion request from the client terminal 302.

In S252, the client terminal 302 samples voice data that has been input via the handset 26 of FIG. 4, and transmits the sampled voice data in a HTML format to the proxy server 303 by HTTP protocol. In S352, the proxy server 303 receives the sampled voice data and, in S353, converts the sampled voice data to text using the voice-to-text converter 303G. In S354, the proxy server 303 transmits the text in the form of HTML data, as converted data, to the client terminal 302 by HTTP protocol. In S253, the client terminal 302 receives the converted data. In S254, the client terminal 302 transfers the received converted data to the mail server as part of an e-mail message using the e-mail controller 91 of FIG. 4.

Figure 17:
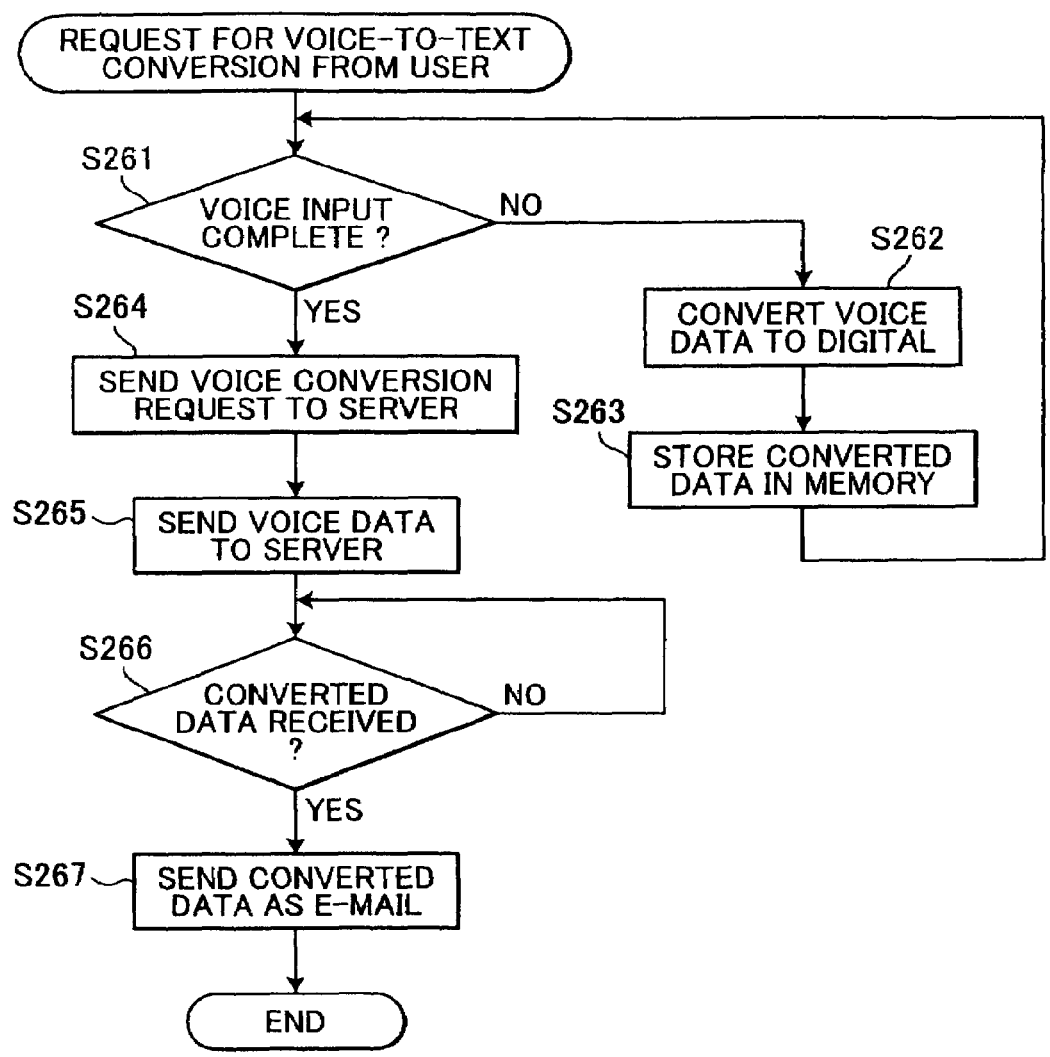
FIG. 17 is a flowchart representing the e-mail transmission process of FIG. 16(a) in detail.
Figure 18:
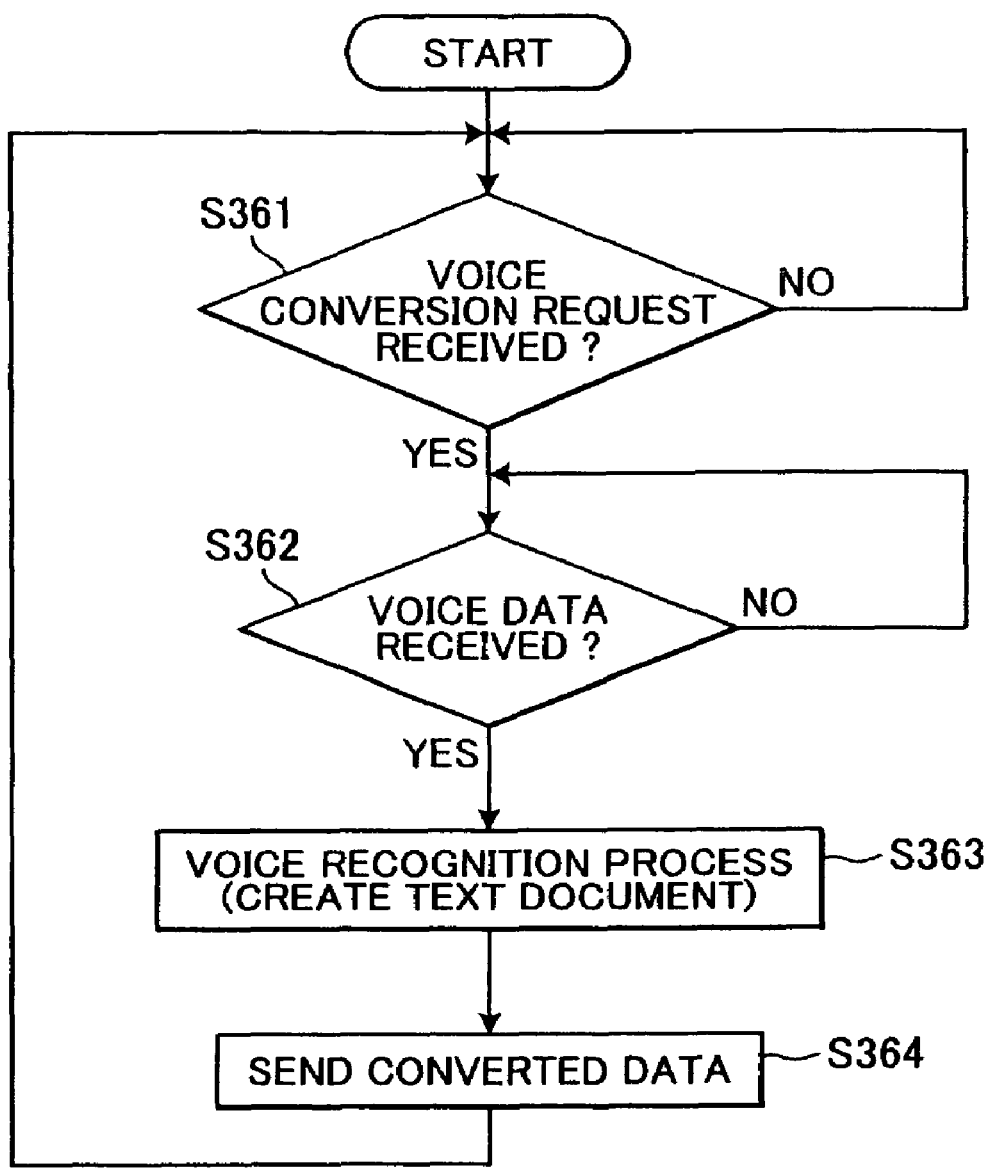
FIG. 18 is a flowchart representing the voice-to-text process of FIG. 16(b) in detail.
Figure 19:
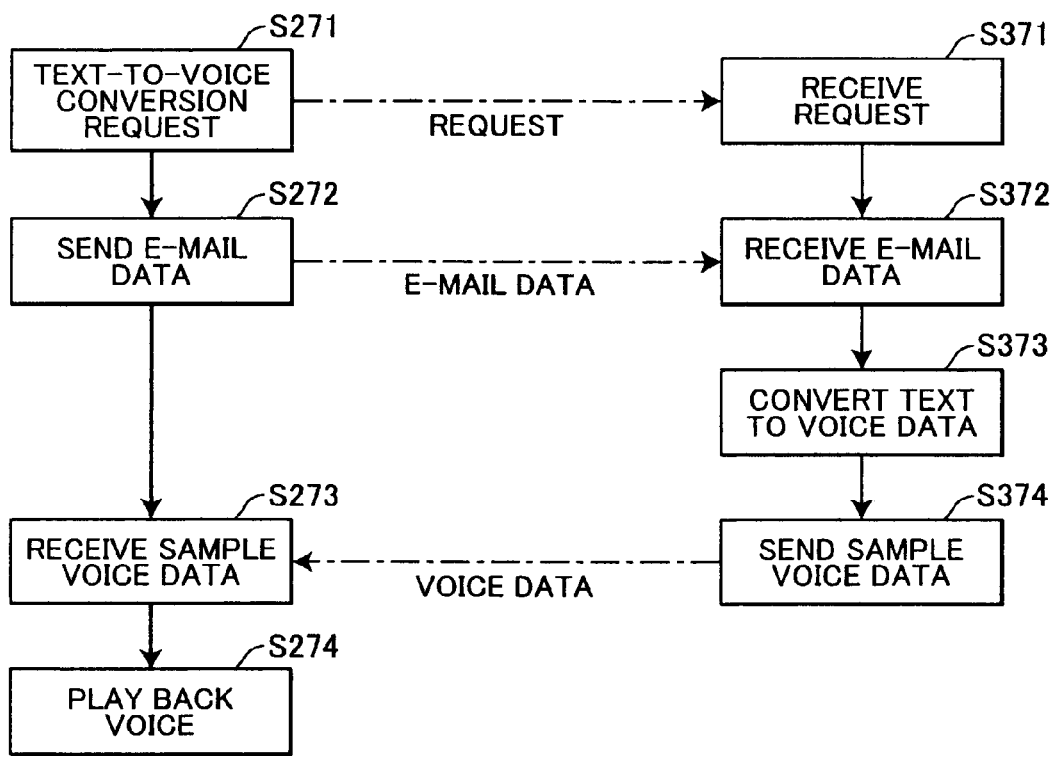
FIG. 19(a) is a flowchart representing overall e-mail reception process executed by the client terminal.
FIG. 19(b) is a flowchart representing overall voice-to-text conversion process executed by the proxy server.

FIG. 17 is a flowchart representing more detailed process executed by the client terminal 302, and FIG. 18 is a flowchart representing more detailed process executed by the proxy server 303.

First, the process executed by the client terminal 302 will be described with reference to FIG. 17. This process starts when the user input a voice-to-text conversion command to the client terminal 302. First, in S261, it is determined whether or not the input of voice data has completed. If not (S261:NO), then in S262, voice data inputted via the handset 26 is converted from analog to digital data. In S263, the digital voice data is stored in the RAM 83 or the RAM 115 of FIG. 4, and the process returns to S261.

If the voice input has completed (S261:YES), then in S264, a voice-to-text conversion request is transmitted to the proxy server 303, and then in S265, the digital voice data is transmitted to the proxy server 303. In S266, it is determined whether or not converted data (text data) has been received from the proxy server 303. If not (S266:NO), then the process waits until converted data is received. If converted data has been received (S266:YES), then in S267, the converted data is transferred to the mail server as part of an e-mail message.

In the meantime, the proxy server 303 executes the process of FIG. 18. First in S361, it is determined whether or not a voice-to-text conversion request has been received from the client terminal 302. If not (S361:NO), then the process waits until a voice-to-text conversion request is received. If so (S361:YES), then in S362, the proxy server 303 determines whether or not digital voice data has been received from the client terminal 302.

If digital voice data has not been received (S362:NO), then the process waits until digital voice data is received. On the other hand, if digital voice data has been received (S362:YES), then in S363, a voice recognition process is performed by the voice-to-text converter 303G to convert the digital voice data to a text data. In S364, the text data is transmitted as converted data to the client terminal 302, and the process returns to S361.

Next, a text-to-voice conversion function of the system 301 of the present embodiment, which is executed when "text-to-voice conversion" mode is selected, will be described. In the text-to-voice conversion function, the proxy server 303 converts text data in an e-mail message into voice data, enabling the client terminal 302 to play back the voice data.

FIG. 19(a) is a flowchart representing an overall process executed by the client terminal 302, and FIG. 19(b) is a flowchart representing an overall process executed by the proxy server 303. Programs for executing the text-to-voice conversion function are stored on the client terminal 302 and the proxy server 303.

In S271 of FIG. 19(a), the client terminal 302 transmits a text-to-voice conversion request by HTTP protocol to the proxy server 303 specified by a URL inputted through the operating keys 270. In S371 of FIG. 19(b), the proxy server 303 receives the text-to-voice conversion request from the client terminal 302.

In S272, the client terminal 302 extracts text data, according to a program stored in the ROM 81, from an e-mail message received via the e-mail controller 91, converts the text data to HTML format, and transmits the converted data by the HTTP protocol to the proxy server 303 as e-mail data. In S372, the proxy server 303 receives the e-mail data.

In S373, the proxy server 303 processes the e-mail data so as to convert the text data to voice data using the text-to-voice converter 303H and, in S374, transmits the sampled voice data in the form of HTML data to the client terminal 302 by HTTP protocol. In S273, the client terminal 302 receives the sampled voice data from the proxy server 303.

In S274, the client terminal 302 plays back the sampled voice data using the handset 26 or IP telephone unit 105 of FIG. 4.

Figure 20:
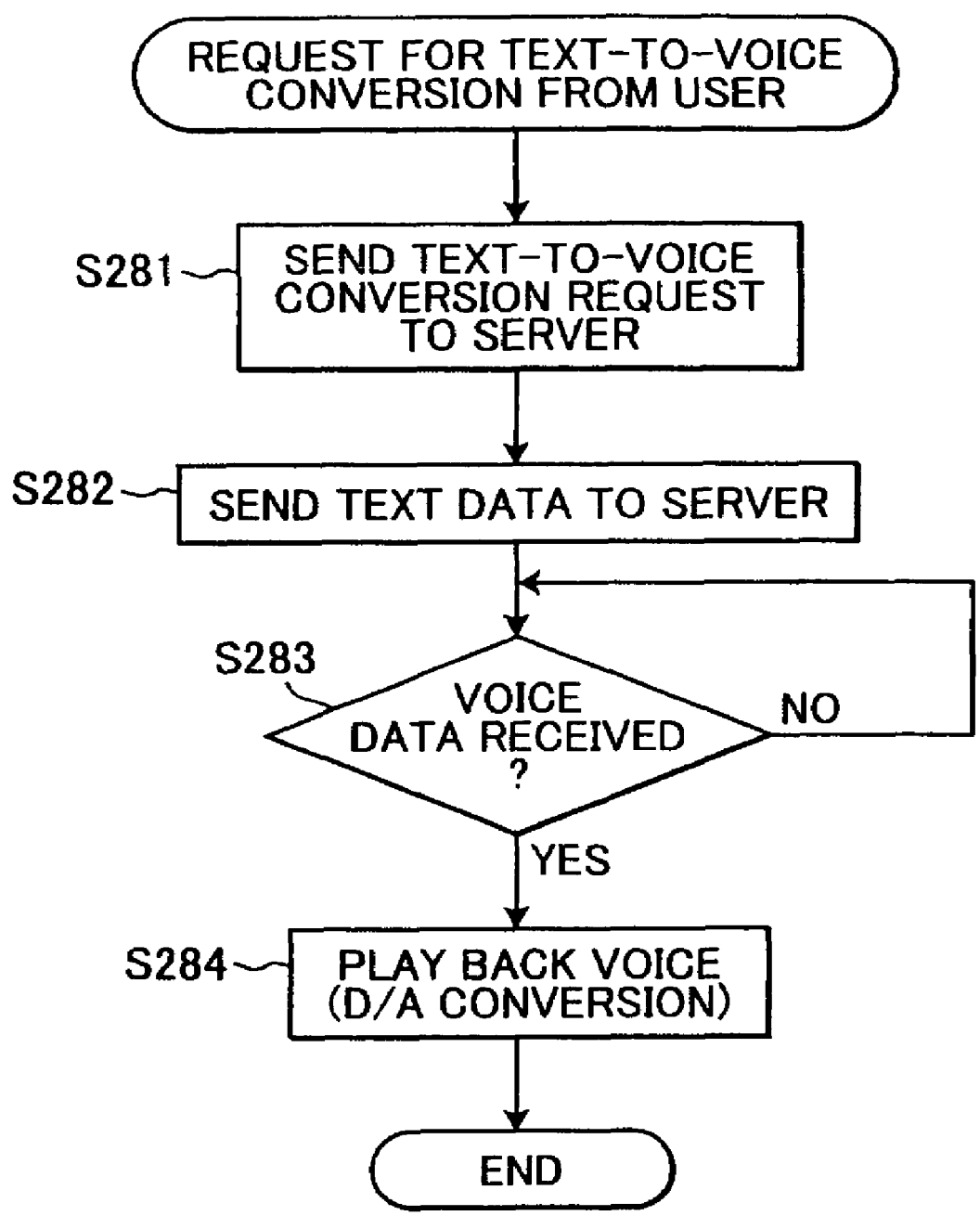
FIG. 20 is a flowchart representing the e-mail reception process of FIG. 19(a) in detail.
Figure 21:
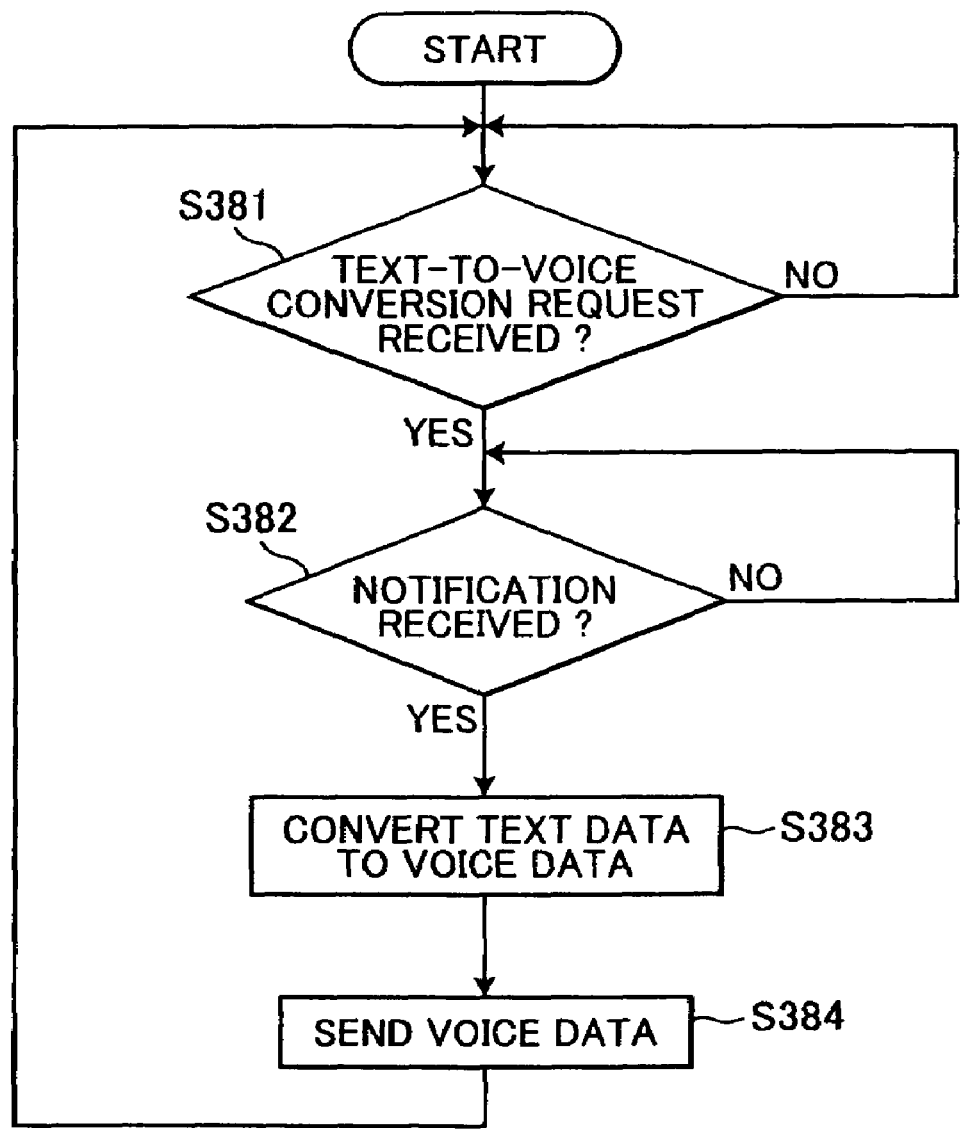
FIG. 21 is a flowchart representing the voice-to-text conversion process of FIG. 19(b) in detail.

FIG. 20 is a flowchart representing more detailed process executed by the client terminal 302, and FIG. 21 is a flowchart representing more detailed process executed by the proxy server 303.

First, the process executed by the client terminal 302 will be described with reference to FIG. 20. This process starts when a text-to-voice conversion request is input by a user. When the process starts, first in S281, a text-to-voice conversion request is transmitted to the proxy server 303. In S282, text data is extracted from an e-mail message and transmitted to the proxy server 303.

In S283, it is determined whether or not voice data has been received from the proxy server 303. If not (S283:NO), then the process waits until the voice data is received. On the other hand, if voice data has been received (S283:YES), then in S284, the voice data is played back.

In the meantime, the proxy server 303 executes the process of FIG. 21. First, in S381, it is determined whether or not a text-to-voice conversion request has been received from the client terminal 302. If not (S381:NO), then the process waits until a text-to-voice conversion request is received. On the other hand, if a text-to-voice conversion request has been received (S381:YES), then in S382, it is determined whether or not e-mail data has been received from the client terminal 302.

If not (S382:NO), then the process waits until e-mail data is received. On the other hand, if so (S382:YES), then in S383, the text data is extracted from the e-mail message and converted into voice data by the text-to-voice converter 303H. In S384, the voice data is transmitted to the client terminal 302, and the process returns to S381.

As described above, according to the present embodiment, even if the client terminal 302 has insufficient resources in the form of the ROM 81, the RAM 83, the ROM 113, the RAM 115, and the like, the client terminal 302 can implement the compact copy function, the OCR function, the voice-to-text conversion function, and the text-to-voice conversion, thereby eliminating the detriment of insufficient resources on the client terminal 302.

Because the proxy server 303 executes expensive functions, such as the compact copy function, the OCR function, the voice-to-text conversion function, and the text-to-voice conversion, in place of the client terminal 302, such functions are virtually provided to the client terminal 302 without requiring a user to downloads specific applications, while keeping costs down.

Further, because the proxy server 303 executes expanded functions, such as the compact copy function, the OCR function, the voice-to-text conversion function, and the text-to-voice conversion, in place of the client terminal 302, the amount of upgrades required by the client terminal 302 to execute such expanded functions is reduced.

While some exemplary embodiments of this invention have been described in detail, those skilled in the art will recognize that there are many possible modifications and variations which may be made in these exemplary embodiments while yet retaining many of the novel features and advantages of the invention.

For example, the programs for executing the above-described various functions can be stored on a storage medium, such as a floppy disk, that can be read by the client terminal 302 and the proxy server 303.

In the system 301 of the above embodiment, the client terminal 302, the proxy server 303, and the e-mail server are connected by the WWW. However, Internet, LAN, or the like could be used rather than the WWW. However, the above effects are remarkably displayed if the WWW is used.

What is claimed is:

1. A system comprising:
   a client device; and
   a server that communicates with the client device, wherein the client device includes:
   a data input unit that inputs object data;
   a scanner that scans a document and generates image data;
   a mode display unit that displays a plurality of modes for selection;
   a mode selecting unit that selects a mode from the plurality of modes displayed on the mode display unit;
   a first transmission unit that transmits request data and one of the object data and the image data to the server, the request data corresponding to the mode selected on the mode selecting unit;
   a first receiving unit that receives processed data; and
   an output unit that outputs the processed data; and
   the server includes:
   a second receiving unit that receives the request data and the one of the object data and the image data from the client device;
   a data processing unit that processes the one of the object data and the image data received by the second receiving unit into the processed data in accordance with the request data; and
   a second transmission unit that transmits the processed data to the client device,
   the plurality of modes including compact copy function mode and at least one of OCR function mode, voice-to-text conversion function mode or text-to-voice conversion function mode.

2. The system according to claim 1, wherein the server further includes memory that stores a program, and the data processing unit of the server processes one of the object data and the image data into the processed data using the program stored in the memory.

3. An electronic device connected to a server including a receiving unit that receives request data and one of object data and image data from a remote device, a data processing unit that processes the object data into processed data in accordance with the request data, and a transmission unit that transmits the processed data to the remote device, the electronic device comprising:
   an input unit that inputs object data;
   a scanner that scans a document and generates image data;
   a mode display unit that displays a plurality of modes for selection;
   a mode selecting unit that selects a mode from the plurality of modes displayed on the mode display unit;
   a transmitting unit that transmits request data and one of the object data and the image data to a server via a network, the request data corresponding to the mode selected on the mode selecting unit;
   a reception unit that receives the processed data into which the server has processed the one of the object data and the image data in accordance with the request data; and
   an output unit that outputs the processed data,
   the plurality of modes including compact copy function mode and at least one of OCR function mode, voice-to-text conversion function mode, or text-to-voice conversion function mode.

4. A control method for controlling a network system, the control method comprising the steps of:

a) inputting object data to a client device;
   b) scanning a document and generating image data;
   c) selecting a mode from a plurality of modes that are displayed at the client device, and transmitting request data and one of the object data and the image data from the client device to a server through a network, the request data corresponding to a selected mode;
   d) processing the one of the object data and the image data into processed data in accordance with the request data at the server;
   e) transmitting the processed data from the server to the client device; and
   f) outputting the processed data at the client device,
   the plurality of modes including compact copy function mode and at least one of OCR function mode, voice-to-text conversion function mode, or text-to-voice conversion function mode.

5. A computer readable medium containing a control program for controlling an electronic device connected to a server including a receiving unit that receives request data and one of object data and image data from the electronic device, a data processing unit that processes the one of the object data and the image data into processed data in accordance with the request data, and a transmission unit that transmits the process data to the electronic device, the control program performing the steps of:

a) inputting the object data;
   b) scanning a document and generating the image data;
   c) selecting a mode from a plurality of modes that are displayed at the client device, and transmitting request data and the one of the object data and the image data to the server via a network, the request data corresponding to a selected mode;
   d) receiving the processed data into which the server has processed one of the object data and the image data in accordance with the request data; and
   e) outputting the processed data,
   the plurality of modes including compact copy function mode and at least one of OCR function mode, voice-to-text conversion function mode, or text-to-voice conversion function mode.

6. The system according to claim 1, the plurality of modes including at least one of compact copy function mode and OCR function mode.

7. The electronic device according to claim 3, the plurality of modes including at least one of compact copy function mode and OCR function mode.

8. The control method of claim 4, the plurality of modes including at least one of compact copy function mode and OCR function mode.

9. The computer readable medium of claim 5, the plurality of modes including at least one of compact copy function mode and OCR function mode.

10. The system according to claim 1, wherein:
    when a first mode is selected, the server performs a first function corresponding to the first mode; and
    when a second mode is selected, the server performs a second function corresponding to the second mode, the second function being different from the first function when the second mode is different from the first mode.

11. The electronic device according to claim 3, wherein:
    when a first mode is selected, the server performs a first function corresponding to the first mode; and
    when a second mode is selected, the server performs a second function corresponding to the second mode, the second function being different from the first function when the second mode is different from the first mode.

12. The control method of claim 4, wherein:
when a first mode is selected, the server performs a first function corresponding to the first mode; and
when a second mode is selected, the server performs a second function corresponding to the second mode, the second function being different from the first function when the second mode is different from the first mode.

13. The computer readable medium of claim 5, wherein:
when a first mode is selected, the server performs a first function corresponding to the first mode; and
when a second mode is selected, the server performs a second function corresponding to the second mode, the second function being different from the first function when the second mode is different from the first mode.

14. A system comprising:
a client device; and
a server that communicates with the client device, wherein
the client device includes:
a scanner that scans a document and generates image data;
a mode display unit that displays a plurality of modes for selection;
a mode selecting unit that selects a mode from the plurality of modes displayed on the mode display unit;
a first transmission unit that transmits request data and the image data to the server, the request data corresponding to the mode selected on the mode selecting unit;
a first receiving unit that receives processed data; and
an output unit that outputs the processed data; and
the server includes:
a second receiving unit that receives the request data and the image data from the client device;
a data processing unit that processes the image data received by the second receiving unit into the processed data in accordance with the request data; and
a second transmission unit that transmits the processed data to the client device,
the plurality of modes including compact copy function mode and OCR function mode.

15. The system according to claim 14, wherein the server further includes memory that stores a program, and the data processing unit of the server processes the image data into processed data using the program stored in the memory.

16. The system according to claim 14, wherein:
when a first mode is selected, the server performs a first function corresponding to the first mode; and
when a second mode is selected, the server performs a second function corresponding to the second mode, the second function being different from the first function when the second mode is different from the first mode.

17. An electronic device connected to a server including a receiving unit that receives request data and image data from a remote device, a data processing unit that processes the image data into processed data in accordance with the request data, and a transmission unit that transmits the processed data to the remote device, the electronic device comprising:
a scanner that scans a document and generates image data;
a mode display unit that displays a plurality of modes for selection;
a mode selecting unit that selects a mode from the plurality of modes displayed on the mode display unit;
a transmitting unit that transmits request data and the image data to a server via a network, the request data corresponding to the mode selected on the mode selecting unit;
a reception unit that receives the processed data into which the server has processed the image data in accordance with the request data; and
an output unit that outputs the processed data,
the plurality of modes including compact copy function mode and OCR function mode.

18. The electronic device according to claim 17, wherein:
when a first mode is selected, the server performs a first function corresponding to the first mode; and
when a second mode is selected, the server performs a second function corresponding to the second mode, the second function being different from the first function when the second mode is different from the first mode.

19. A control method for controlling a network system, the control method comprising the steps of:
a) scanning a document and generating image data;
b) selecting a mode from a plurality of modes that are displayed at the client device, and transmitting request data and the image data from the client device to a server through a network, the request data corresponding to a selected mode;
c) processing the image data into processed data in accordance with the request data at the server;
d) transmitting the processed data from the server to the client device; and
e) outputting the processed data at the client device,
the plurality of modes including compact copy function mode and OCR function mode.

20. The control method according to claim 19, wherein:
when a first mode is selected, the server performs a first function corresponding to the first mode; and
when a second mode is selected, the server performs a second function corresponding to the second mode, the second function being different from the first function when the second mode is different from the first mode.

21. A computer readable medium containing a control program for controlling an electronic device connected to a server including a receiving unit that receives request data and image data from the electronic device, a data processing unit that processes the image data into processed data in accordance with the request data, and a transmission unit that transmits the processed data to the electronic device, the control program performing the steps of:
a) scanning a document and generating the image data;
b) selecting a mode from a plurality of modes that are displayed at the client device, and transmitting request data and the image data to the server via a network, the request data corresponding to a selected mode;
c) receiving the processed data into which the server has processed the image data in accordance with the request data; and
d) outputting the processed data,
the plurality of modes including compact copy function mode and OCR function mode.

22. The computer readable medium according to claim 21, wherein:
when a first mode is selected, the server performs a first function corresponding to the first mode; and
when a second mode is selected, the server performs a second function corresponding to the second mode, the second function being different from the first function when the second mode is different from the first mode.

* * * * *